US012793183B2

(12) United States Patent
Koch et al.

(10) Patent No.: US 12,793,183 B2
(45) Date of Patent: Nov. 10, 2026

(54) METHOD OF DENOISING DENTAL IMAGES THROUGH DOMAIN ADAPTATION

(71) Applicant: 3SHAPE A/S, Copenhagen K (DK)

(72) Inventors: Thorbjørn Lauring Koch, Copenhagen K (DK); Jacob Frøsig, Copenhagen K (DK); Thomas Sangild Sørensen, Copenhagen K (DK)

(73) Assignee: 3SHAPE A/S, Copenhagen K (DK)

( * ) Notice: Subject to any disclaimer, the term of this patent is extended or adjusted under 35 U.S.C. 154(b) by 491 days.

(21) Appl. No.: 17/999,128

(22) PCT Filed: May 12, 2021

(86) PCT No.: PCT/EP2021/062754
§ 371 (c)(1),
(2) Date: Nov. 17, 2022

(87) PCT Pub. No.: WO2021/233767
PCT Pub. Date: Nov. 25, 2021

(65) Prior Publication Data
US 2023/0196515 A1 Jun. 22, 2023

(30) Foreign Application Priority Data
May 19, 2020 (EP) .................................... 20175528

(51) Int. Cl.
*G06T 5/70* (2024.01)
*G06T 3/4046* (2024.01)
(Continued)

(52) U.S. Cl.
CPC .............. *G06T 5/70* (2024.01); *G06T 3/4046* (2013.01); *G06T 5/50* (2013.01); *G06V 10/30* (2022.01);
(Continued)

(58) Field of Classification Search
CPC ........... G06T 5/70; G06T 3/4046; G06T 5/50; G06T 2207/20076; G06T 2207/20081;
(Continued)

(56) References Cited

U.S. PATENT DOCUMENTS

| | | | | |
|---|---|---|---|---|
| 8,824,753 B2 * | 9/2014 | Souza | ...................... | G06T 5/20 382/128 |
| 10,635,943 B1 | 4/2020 | Lebel et al. | | |

(Continued)

FOREIGN PATENT DOCUMENTS

| | | |
|---|---|---|
| CN | 108280811 A | 7/2018 |
| CN | 110298804 A | 10/2019 |

(Continued)

OTHER PUBLICATIONS

T. L. Koch, M. Perslev, C. Igel and S. S. Brandt, "Accurate Segmentation of Dental Panoramic Radiographs with U-NETS," 2019 IEEE 16th International Symposium on Biomedical Imaging (ISBI 2019), Venice, Italy, 2019, pp. 15-19, doi: 10.1109/ISBI.2019.8759563. (Year: 2019).*

(Continued)

*Primary Examiner* — Andrew M Moyer
*Assistant Examiner* — Conor A O'Malley
(74) *Attorney, Agent, or Firm* — Buchanan Ingersoll & Rooney PC

(57) ABSTRACT

Disclosed is a computer-implemented method of denoising dental images, comprising: obtaining a training set of images of a first type, comprising noisy images and true images, where the noisy image is the true image with generated noise; training at least one neural network on the training set; and denoising a dental image of the second type through the trained neural network.

21 Claims, 20 Drawing Sheets

(51) Int. Cl.

| | |
|---|---|
| ***G06T 5/50*** | (2006.01) |
| ***G06V 10/30*** | (2022.01) |
| ***G06V 10/44*** | (2022.01) |
| ***G06V 10/82*** | (2022.01) |

(52) U.S. Cl.
CPC .............. *G06V 10/44* (2022.01); *G06V 10/82* (2022.01); *G06T 2207/20076* (2013.01); *G06T 2207/20081* (2013.01); *G06T 2207/20084* (2013.01); *G06T 2207/20192* (2013.01); *G06T 2207/20212* (2013.01); *G06T 2207/30036* (2013.01)

(58) Field of Classification Search
CPC . G06T 2207/20084; G06T 2207/20192; G06T 2207/20212; G06T 2207/30036; G06V 10/82; G06V 10/30; G06V 10/44
See application file for complete search history.

(56) References Cited

U.S. PATENT DOCUMENTS

| | | | | |
|---|---|---|---|---|
| 2003/0039401 | A1* | 2/2003 | Gallagher | G06T 7/41 382/286 |
| 2013/0089246 | A1 | 4/2013 | Souza et al. | |
| 2017/0220897 | A1* | 8/2017 | Chidlovskii | G06F 18/214 |
| 2019/0035118 | A1* | 1/2019 | Zhao | G06T 3/4076 |
| 2021/0104313 | A1* | 4/2021 | Mizobe | A61B 3/005 |
| 2021/0153823 | A1* | 5/2021 | Schildkraut | A61B 6/51 |

FOREIGN PATENT DOCUMENTS

| | | | | |
|---|---|---|---|---|
| CN | 110310244 A | | 10/2019 | |
| CN | 110443758 A | | 11/2019 | |
| CN | 110858391 A | | 3/2020 | |
| CN | 111145177 A | * | 5/2020 | G06K 9/6268 |
| CN | 111598808 A | * | 8/2020 | G06N 20/20 |
| WO | 2019240257 A1 | | 12/2019 | |

OTHER PUBLICATIONS

Bai, "A Comprehensive Introduction to Different Types of Convolutions in Deep Learning", Feb. 11, 2019, https://towardsdatascience.com/a-comprehensive-introduction-to-different-types-of-convolutions-in-deep-learning-669281e58215.

Kim et al., "Application of CT Simulation Technique for Virtual Ultra-Low-Dose Trial in CT Colonography" Abdominal Imaging 2012, LNCS 7601, pp. 49-57, 2012.

Senthilkumaran et al., "Edge Detection Techniques for Image Segmentation—A Survey of Soft Computing Approaches", Information Paper, International Journal of Recent Trends in Engineering, vol. 1, No. 2, pp. 250-254, May 2009.

Guo et al., "Toward Convolutional Blind Denoising of Real Photographs" Arxiv.Org, Cornell University Library, 201 Olin Library Cornell University Ithaca, NY 14853, Jul. 12, 2018.

International Search Report (PCT/ISA/210) and Written Opinion (PCT/ISA/237) mailed on Sep. 6, 2021, by the European Patent Office as the International Searching Authority for International Application No. PCT/EP2021/062754. (22 pages).

Invitation to Pay Additional Fees (Form PCT/ISA/206) corresponding to PCT/EP2021/062754 issued on Jul. 16, 2021.

First Office Action dated Dec. 27, 2025, issued in the corresponding Chinese Patent Application No. 202180046971.8, 17 pages including 9 pages of English Translation.

* cited by examiner

FIG. 3A
301
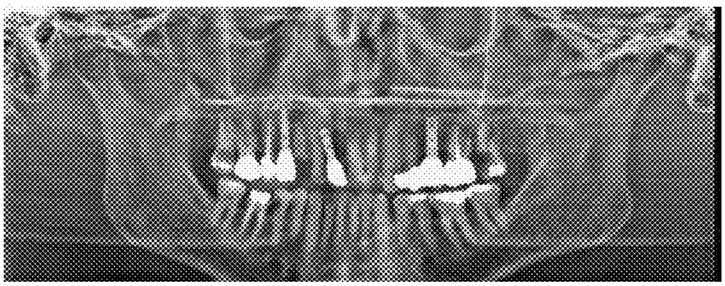
302
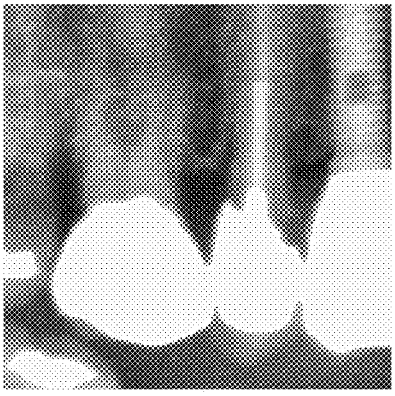
FIG. 3B
303
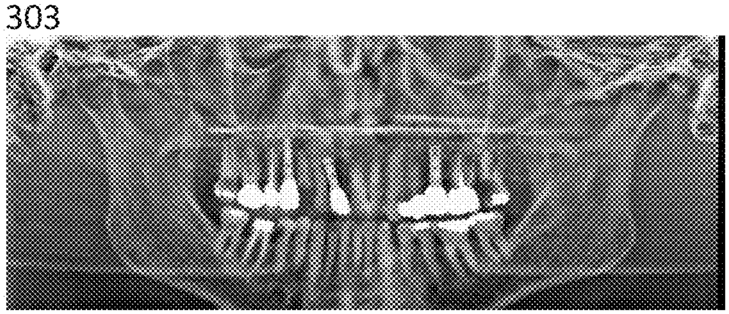
304
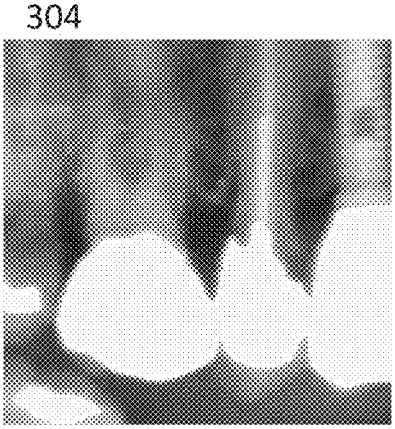
FIG. 3C
305
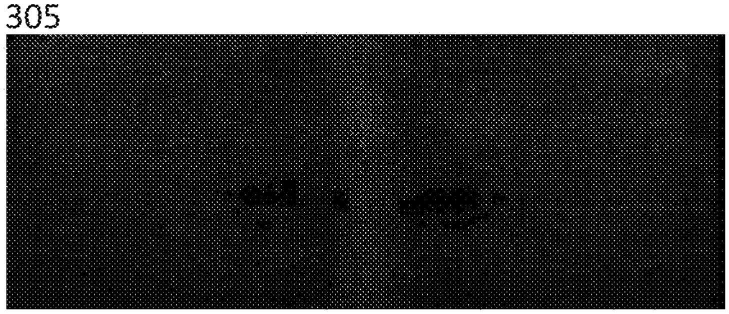
306
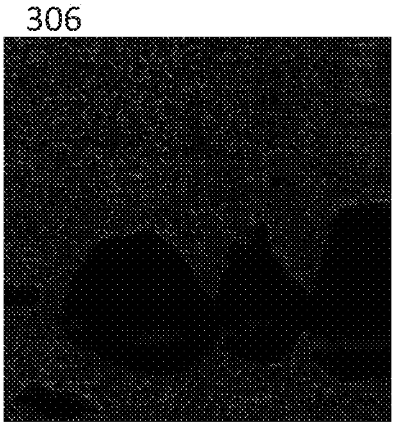

FIG. 4
401
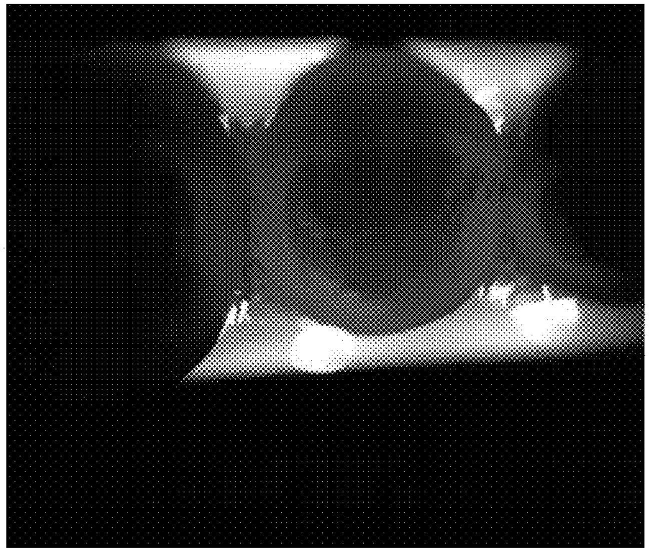
402
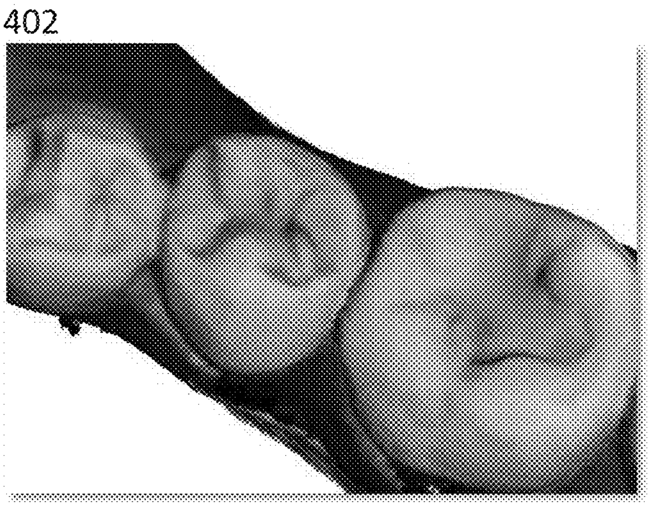
403
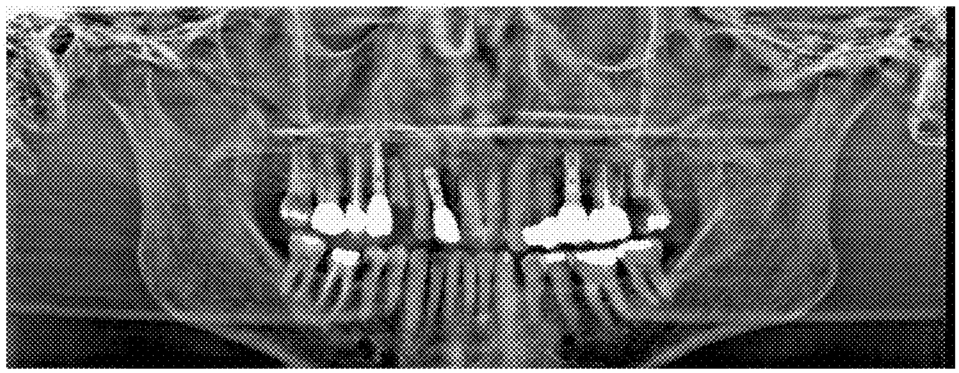

FIG. 6A -
Uniform 601
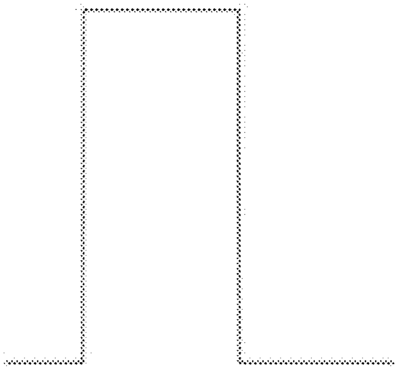
602
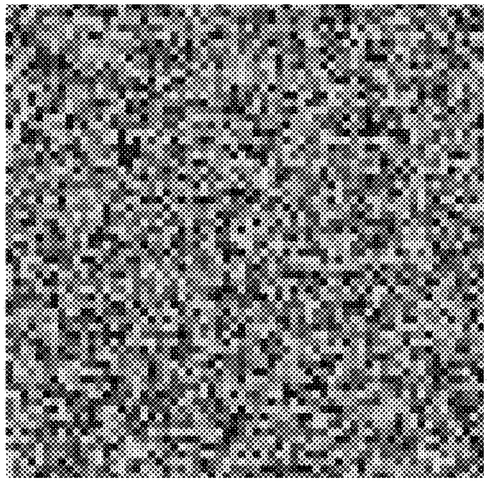
FIG. 6B -
Gaussian 603
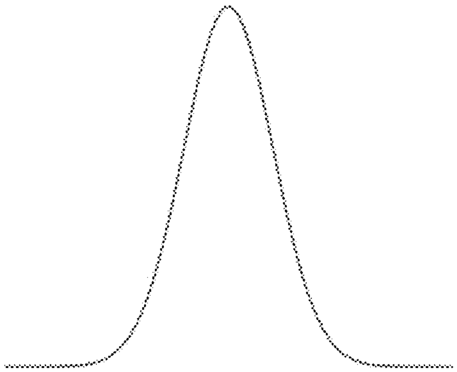
604
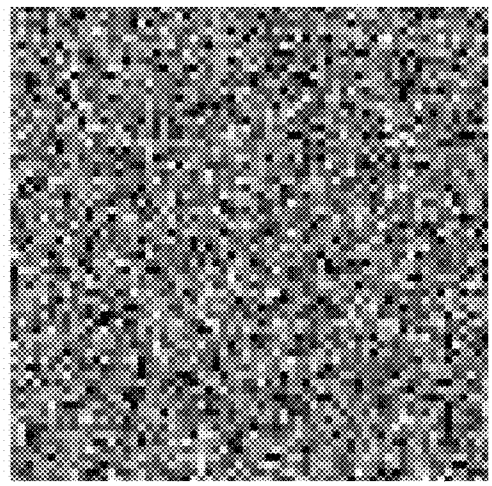
FIG. 6C -
Poisson 605
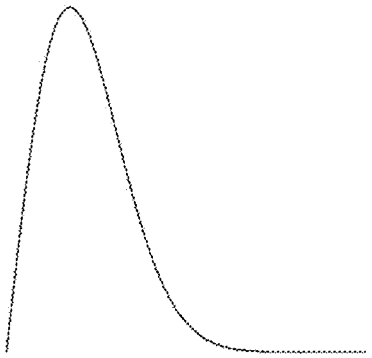
606
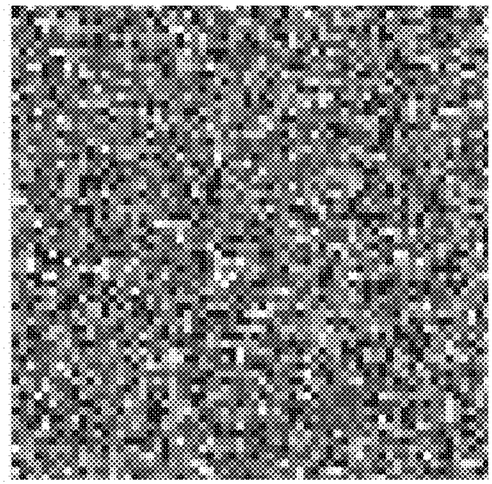

FIG. 8

801

| | |
|---|---|
| 2 | 1 |

802

| | | |
|---|---|---|
| 1 | 1 | 1 |
| 1 | 1 | 1 |
| 1 | 1 | 1 |

803

| | | | | |
|---|---|---|---|---|
| 1 | 4 | 7 | 4 | 1 |
| 4 | 16 | 26 | 16 | 4 |
| 7 | 26 | 41 | 26 | 7 |
| 4 | 16 | 26 | 16 | 4 |
| 1 | 4 | 7 | 4 | 1 |

FIG. 9
901
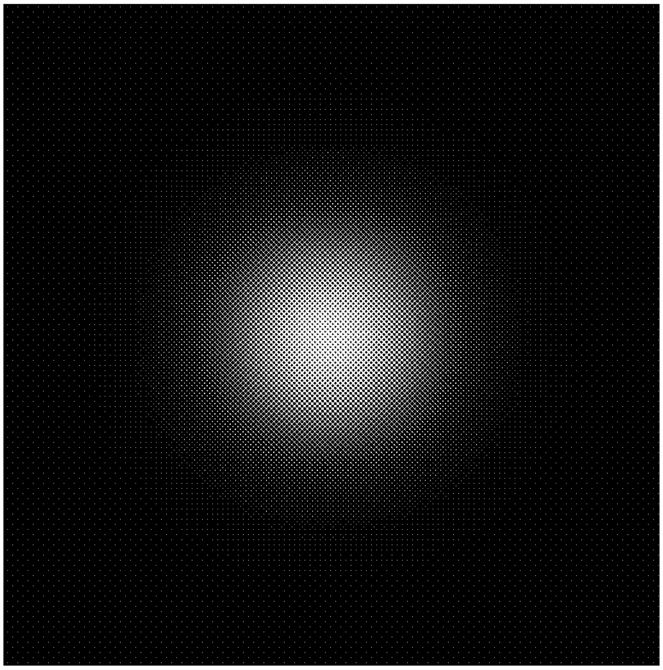
902
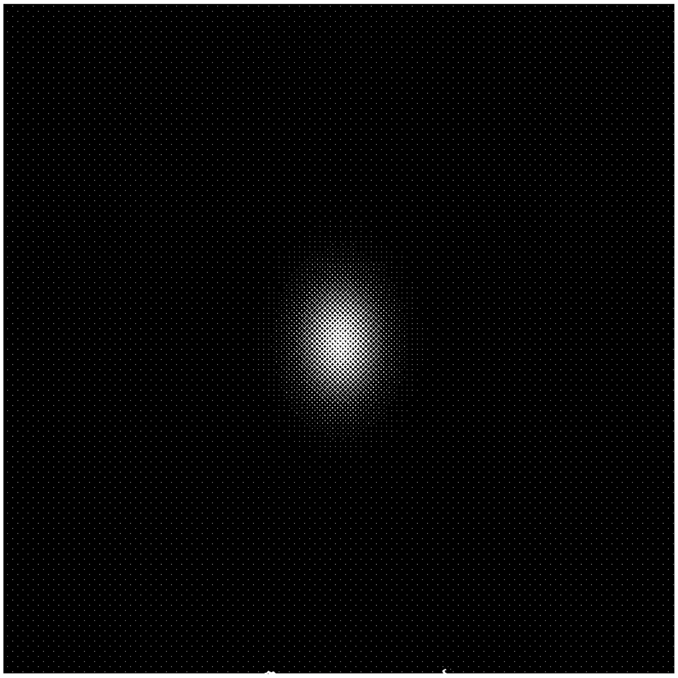

FIG. 11
1101
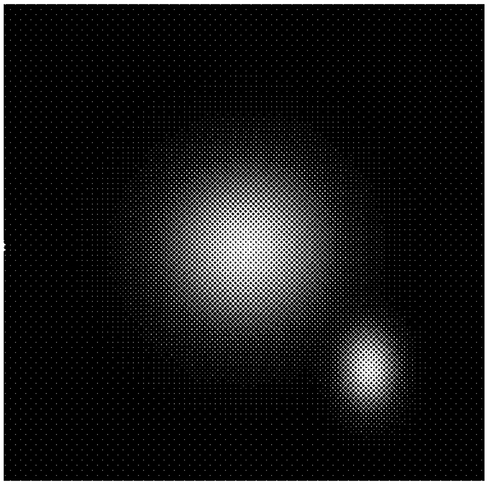
1102
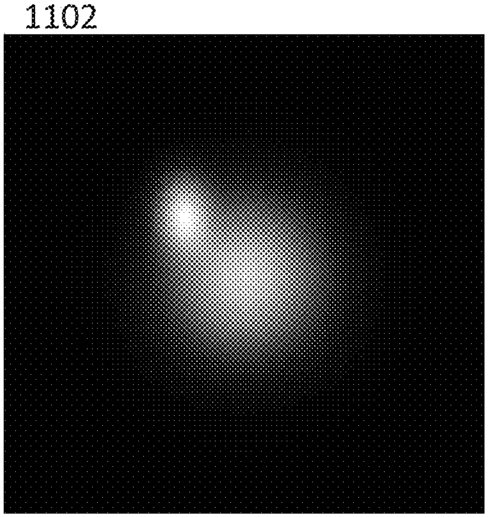

FIG. 12 – demo of smooth scaling map

FIG. 13 – encoder/decoder example

FIG. 16
Fig. 16A
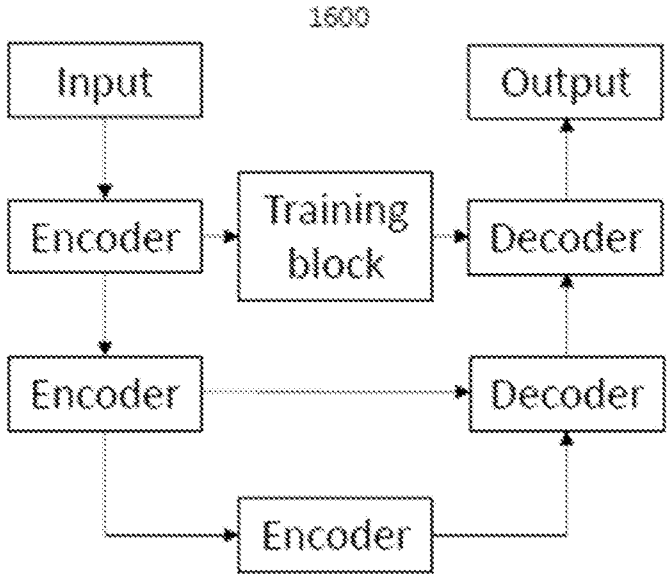
Fig. 16B
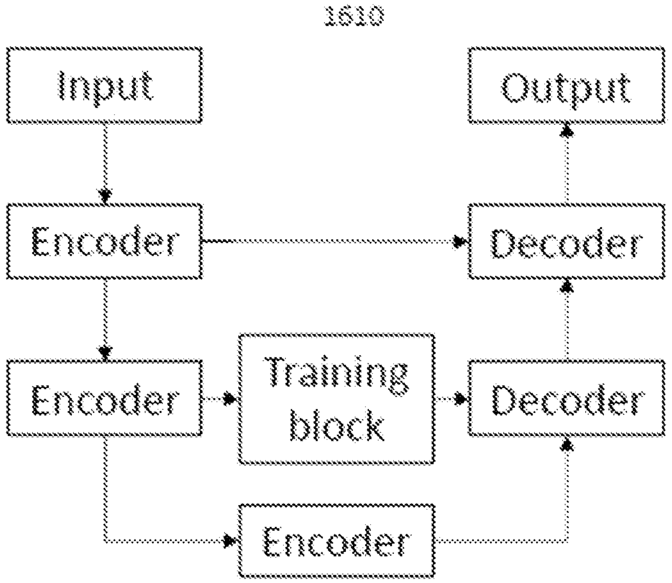

METHOD OF DENOISING DENTAL IMAGES THROUGH DOMAIN ADAPTATION

CROSS-REFERENCE TO RELATED APPLICATIONS

This patent application is a national stage application of PCT/EP2021/062754, filed on May 12, 2021, which is related to and claims the benefit of priority of EP20175528.7, filed on May 19, 2020, the entire contents of each being incorporated herein by reference.

BACKGROUND OF THE INVENTION

Field of the Invention

This disclosure generally relates to a system and method for a method of denoising dental images through domain adaptation, by using at least one neural network trained to denoise images based on noisy and true images of a first type, and applied to dental images of a second type.

Description of Related Art

Images may often be noisy, that is, have some artefacts that are not a reflection of the underlying object of the image. Noise may come from many sources, for example, errors in the camera or scanner used to take the image, unintentional movements in taking the image, or natural background noise. Denoising is the removal of this noise, often to obtain an image that is a more accurate depiction of the underlying object. However, careless denoising techniques may accidentally remove small structures that truly belong to the underlying object.

Machine learning techniques such as neural networks may be trained to denoise images. These, however, typically rely on having ground truth images to train on. In certain situations, such as radiographic scans, ground truth images may not exist because of the both the high doses of radiation required to obtain them and blurring from the sensors used to take such images when used for a longer period of time.

BRIEF SUMMARY OF THE INVENTION

This disclosure discloses a computer-implemented method of denoising dental images, comprising:

- obtaining a training set comprising images of a first type, wherein the training set comprises a plurality of data pairs, where each data pair comprises a noisy image and a true image, where the noisy image is the true image with generated noise;
- training at least one neural network on the training set, wherein input for the at least one neural network is a plurality of the noisy images, and a target of the at least one neural network is a plurality of the true images that correspond to the plurality of the noisy images, such that inputting a noisy image into a trained neural network is results in output of a denoised image similar to a true image corresponding to the input noisy image;
- obtaining a dental image of a second type; and
- denoising a dental image of the second type by using the image of the second type as input for the trained neural network.

This disclosure discloses a method of denoising a dental image using machine learning and domain adaptation. Typically, a machine learning algorithm can be trained to perform a task based on target data, which in a denoising task would be a better image or a true image as compared to the noisy image.

A true image here is the ground truth for an image, the objective verification of the particular properties of a digital image, used to test the accuracy of automated image analysis processes. Practically, it may be thought of as an image that accurately reflects an underlying object without excessive noise. A true image may be, for example, a high-quality photograph in grayscale or in color, and/or a high-quality computer rendering.

However, in some cases, such as radiographic images, a true image may not exist. Hence, this disclosure uses domain adaptation, that is, training on one type of data and transferring that training to another type of data, to overcome the lack of true images. Further, by using generated noise, this disclosure allows a more accurate model of the noise for a particular situation, allowing more accurate denoising.

The images used in this disclosure are two-dimensional digital images. Digital images are typically expressed as a matrix of pixels, where each pixel comprises at least one color value, among other information. This makes them suitable for machine learning techniques, because images that can be understood by humans can easily be translated to matrices that can be read by computers, by maintaining the original arrangement of pixels and converting visible color values to numerical color values. The image may be taken directly by a digital device, for example a digital camera or a digital scanner, or may be an analog image scanned into a digital one, e.g., a traditional X-ray that is scanned by a flat scanner.

Because images may be represented as matrices, images and matrices alike may be subject to a number of matrix operations. In particular, the application or combination of one image/matrix to another may be thought of as different ways to capture technical effects with mathematical operations. These operations include but are not limited to: concatenation, elementwise multiplication, inner products, outer products, a combination of any of the preceding, and/or a weighted combination of any of the preceding. These operations apply to images/matrices throughout the disclosure.

A dental image is an image relating to dentistry. It may be for example, an photograph of a tooth, a dental pantomogram, an infrared image of a tooth. Dental images include but are not limited to radiographic images and/or infrared images, as discussed below.

Machine learning is a general term for a collection of algorithms that generate output based on learning from data. Examples of machine learning algorithms include but are not limited to: neural networks, support vector machines, random forests, k-nearest neighbor classification. Machine learning algorithms, particularly neural networks, may be used to denoise images.

Machine learning algorithms, however, typically require that output be generated based on existing data. So, if for example, the machine learning algorithm were trained to denoise an image, it would require true images with no noise to be trained on.

In certain cases, this is not possible. For example, radiographic scans do not have true images because of the both the high doses of radiation required to obtain them and blurring from the sensors used to take such images when used for a longer period of time. In other words, radiographic scans are always noisy.

This disclosure may use domain adaptation to get around the problem of a lack of true images. Domain adaptation is training for a solution for one domain, and then applying it to another domain. An example of different domains is images obtained at different wavelengths of light. Here, that first type of object may be photos, and the second type of object may be radiographic images. The photos may be obtained at the visible spectrum, while radiographic images may be obtained based on, for example, by: X-rays; gamma radiation; similar ionizing and non-ionizing radiation. Further examples are discussed below.

In an embodiment, the images of the first type include images acquired by a medical imaging modality such as magnetic resonance (MR). The term "medical imaging modality" includes a type of medical imaging technology. This may include magnetic resonance MR, computed tomography CT, X-ray, ultrasound, Positron emission tomography (PET), etc. In this embodiment, the images of the first type does not include images acquired by non-imaging modalities like a photo from a digital camera, such photos may require transformation of the image into a medical-like image.

In an embodiment, the images of the first type include images that are directly used as true images in the data pair. The term "directly used" refers to avoiding transformation of the images into a medical imaging modality and/or at least substantially preventing noise reduction of the images before the images are used as true images. These images may include black-and-white photographs that may be based on data acquired from Cone beam computed tomography or color images that may be based on a data acquisition from an intraoral scanner. It is generally preferred that these images representing true images are at least substantially free of noise.

The disclosure further comprises using generated noise, noise that is generated. Generated noise allows the creation of a more accurate noise model that may reflect the noise particular to the situation, and therefore, allows the machine learning algorithm to better learn the noise model, an improving its ability to denoise the image. Details on how to generate noise are discussed below.

Finally, in denoising, removing as much noise as possible does not result in the most accurate images. Often, there are small details that may look like noise, but they are actually semantically significant. Thus, to accurately reflect the underlying object, a denoiser needs to be able to recognize and retain these features.

An embodiment begins with training a neural network on a training set of images of a first type. The training set is comprised of data pairs, each of which contains a noisy image and a true image. Images of the first type need not be dental images; they may be, for example, detailed photographs and/or computer renderings.

In the disclosure, the noisy image is the true image with generated noise applied to it. This application for be done, for example, by concatenation, elementwise multiplication, and/or a combination of the preceding.

At least one neural network is then trained on the training set, where the input of the at least one neural network is the noisy image and the target of the at least one neural network is the true image. This results in a trained neural network that may be used on new input data, such that the trained neural network then turns that new input data into new output data in a manner similar to the way it turned the training set of noisy images into true images.

A neural network is a network or circuit of artificial nodes, which may be trained to generate some output data from some input data. A node may be comprised of a In training a neural network, a set of training data is used. This set may be comprised of input data and target data. Training is where the nodes of the neural network are changed to generate output data more similar to target data, given a particular set of input data. Once a neural network is trained, it may be used on new input data to generate output data similar to the target data.

While the simplest neural networks may be comprised of an input later, a hidden layer, and an output layer, neural network architecture can vary greatly, usually to improve the neural network's performance on a particular problem. Details of the architecture of the at least one neural network used here are described below. As data flows through the neural network(s), each component will have input data, output data, and may also have intermediate data, as the data changes.

Here, the term at least one neural network is used to describe the set of operations that occurs to the initial input and the final output. In the art, the plural and singular forms for neural network are often interchangeable, since putting multiple networks together often results in one network. At times, the term "the neural network" is also used to describe this.

Next, a dental image of a second type is obtained. The second type may be, for example: radiographic images, infrared images, fluorescence images.

The dental image of the second type is then input into the trained neural network, which returns a denoised dental image of the second type. At this step, domain adaptation may take place—for example, the first and second type of image may be color photographs and dental pantomograms, respectively. This means that the at least one neural network may be trained on color photographs, but used to denoise dental pantomograms. The method of this disclosure particularly allows for denoising where no true image is possible for the dental image of the second type, e.g., dental pantomograms.

A method further comprises wherein the dental image of the second type is a fluorescence image, a hyperspectral image, an infrared image, and/or a radiographic image.

A fluorescence image uses fluorescent dyes or proteins to highlight particular biological structures. In dental images, it may, for example be used to detect dental plaque.

A hyperspectral image is a spectral image where each pixel of the image was employed to acquire a set of images within certain spectral bands.

An infrared image is an image obtained at the infrared spectrum. In dental applications, it may be useful, for example, for caries detection.

A radiographic image is an image obtained by using X-rays, gamma rays, or similar ionizing radiation and non-ionizing radiation to view the internal form of an object. Radiographic imaging methods include, for example: X-rays, CT scans, pantomograms (i.e., panoramic radiographs). As discussed above, it may be impossible to take a ground truth image of such an image and so the domain adaptation discussed above may be particularly useful for this.

An embodiment further comprising generating at least one of the data pairs by:

- generating a noise matrix; and
- generating the noisy image by combining the true image with the noise matrix, where the data pair is comprised of the true image and the generated noisy image.

An embodiment further comprises generating a data pair by generating a noise matrix and combining it with an instance of a true image to generate a noisy image corresponding to that true image. A noise matrix is a matrix of varying values that resembles a noise distribution. Details of how a noise matrix may be generated are discussed below.

By generating a noise matrix, the method of this disclosure allows for allow the use of a more accurate noise model, which in turn allows for the at least one neural network to better learn a noise model and therefore, what noise ought to be removed. Details of such implementations are discussed below.

Once the noise matrix is generated, it may be combined with the true image to generate a noisy image. This combination may be, for example, element-wise multiplication, concatenation, a weighted version of the preceding, and/or a combination of the preceding. A noise matrix that is of a different size that the true image may be, for example, cropped, tiled, shrunk, and/or stretched to match.

An embodiment further comprises generating the noise matrix by:

generating an empty matrix;

generating values from a probability distribution; and generating the noise matrix by assigning one of the generated values to each element of the empty matrix.

In an embodiment, a noise matrix is generated from a probability distribution.

First, an empty matrix is generated. An empty matrix has dimensions, but no values for its elements.

Next, values are generated from a probability distribution. Examples of probability distributions include Gaussian, Poisson, uniform, gamma, and impulse distributions. Each value has a probability of being selected based on what the probability is; while any given value may vary, the overall selection of values is likely to follow the probability distribution.

Values are then assigned to each element of the empty matrix, resulting in a noise matrix. As mentioned above, the color value in an image or matrix may be expressed as both a numerical value and as a visible color. Thus, the noise matrix be viewed as either a matrix of number or an image of pixels. When applied to the true image, by an operation described above, the noise matrix simulates noise.

This noise matrix may reflect different distributions of noise, depending on the probability distribution used to generate it. Using a probability distribution emulates the random nature of noise, and allows the at least one neural network to be trained on different types of noise, which in turn allows it to remove noise more accurately.

Further embodiments of the noise matrix are discussed below.

An embodiment further comprises generating the noise matrix with at least one blurring kernel by:

generating a blurring kernel, comprising a matrix of dimensions of at least two by one, where each element of the blurring kernel has a weight value;

selecting an element of the noise matrix; and altering the value of the selected element based on the combined value of at least one neighboring element and the weight values of at least one corresponding element of the blurring kernel.

An embodiment uses blurring kernels to allow the noise matrix to more realistically simulate noise, and thereby allow the at least one neural network to better learn noise. Blurring kernels "blur", that is, smooth over differences between neighboring values, allowing for values to be affected by their neighbors. This may more accurately reflect real noise, which the value of a given pixel is not completely random over an entire image, but more likely to be similar to its neighbors than far-off pixels.

A blurring kernel may be applied to the noise matrix to alter neighboring elements to be more similar to each other, while maintaining the random nature of the noise matrix. Blurring kernels may be, for example: uniform, Gaussian. Examples of blurring kernels are discussed below.

An embodiment generates a blurring kernel, here, a matrix of dimensions of at least two by one. Each element of the blurring kernel has a weight value, a value used to weight a corresponding element from the image/matrix it is applied to.

An element of the noise matrix may then be selected, and the blurring kernel applied to the selected element. Applying the blurring kernel comprises matching an element of the blurring kernel to the selected element, assigned corresponding values from the blurring kernel for neighboring elements of the selected element, based on location. The value of the selected element is altered based on a combination of the values of the neighboring elements, as weighted by their corresponding weight values from the blurring kernel.

The blurring kernel may smooth an area of a noise matrix by being applied to each element of that area. It may also be used to smooth the entire noise matrix.

An embodiment further comprises generating a spatially variant noise matrix by:

generating at least one smooth scaling map; and generating the spatially variant noise matrix by applying the at least one smooth scaling map to a noise matrix.

An embodiment uses a spatially variant noise matrix, a noise matrix where the intensity and/or distribution of noise varies across different areas of the matrix. Noise may not be uniformly distributed over an image. For example, where a sensor hovers over a particular area for longer, there will be more noise. Therefore, allowing the at least one neural network to learn a noise model where certain areas are noisier than others may allow for better denoising.

An embodiment uses a smooth scaling map to generate a spatially variant noise matrix. A smooth scaling map comprises a matrix where at least two different areas of the map have different noise intensity and/or structure.

A smooth scaling map may be applied to the noise matrix, as described above, by e.g., concatenation, elementwise multiplication, and so on. A smooth scaling map may also be stretched, shrunk, cropped, and/or tiled to fit a noise matrix. Smooth scaling maps may be combined, and/or or applied on top of one another. Examples of smooth scaling maps and the implementation of such maps is discussed below.

When a smooth scaling map is applied to a noise matrix as generated above, it may dampen noise some areas and enhance noise in others. The spatially variant noise matrix that results from this application allows for a noise matrix adapted to the noise patterns of a particular image, while still maintaining the random nature of noise. This allows the at least one neural network to learn, for example, that a particular area of an image is noisier, or alternately, that area is not noise. The latter application may be particularly useful in preserving structures that would be removed by a cruder denoising.

An embodiment further comprises generating the smooth scaling map with a 2D kernel by:

generating an initial matrix populated by identical values;

generating the 2D kernel;

selecting an element of the initial matrix; and generating a smooth scaling map by locating the 2D kernel based on the selected element, and applying each element of the 2D kernel to a corresponding element on the initial matrix.

An embodiment generates a smooth scaling map with a 2D kernel. A 2D kernel is a two-dimensional array of values, generated from some probability function. The probability distribution may be, for example: Gaussian distribution, Poisson distribution, impulse distribution, noise distribution. The 2D kernel, particularly when combined with other smooth scaling maps, allows for a more accurate noise model to be learned by the at least one neural network. A 2D kernel may allow noise to be concentrated or muted in a particular area of an image.

To create a smooth scaling map with a 2D kernel, an initial matrix is generated with identical values. The identical values may be adapted to the situation. For example, an identical value of one may make sense where the smooth scaling map is to be applied to the noise matrix by elementwise multiplication. On the other hand, if the noise matrix is a red, green, or blue channel, which typically has values of 0 to 255, and the smooth scaling map is meant to be applied by concatenation, it may be useful to set the identical value to 30, to limit the range of the smooth scaling map.

Next, a 2D kernel is generated. As mentioned above, A 2D kernel is a two-dimensional array of values, generated from some probability function, for example: Gaussian distribution, Poisson distribution, impulse distribution, noise distribution.

An embodiment generating a 2D Gaussian kernel may comprise generating a number of values from two Gaussian distributions, each with a mean and a standard deviation. The standard deviations may be the same or different and determine the length and width. The generated values of the two Gaussians are combined in an array. This results in the 2D Gaussian kernel, which, if visualized in grayscale, may represent a blurred circle or ellipse with the peak value at the center, gradually fading out towards the edges of the ellipse and/or circle.

The values of the array may optionally be normalized, for example, to values between 0 and 1. Other embodiments may use non-symmetrical distributions, and therefore, the element with peak value may not be at the center of the 2D kernel.

An element of the initial matrix is selected.

The 2D kernel is then applied to the initial matrix, with its location based on the location of the selected element. For example, for 2D Gaussian kernel, an element at the center may be matched to the selected element of the initial matrix, and neighboring elements adjusted based on the corresponding value from the 2D kernel. The resulting matrix is the smooth scaling map.

A 2D kernel need not match the initial matrix in size, not does every element of the 2D kernel need to be used, at least at first. The 2D kernel be stretched, shrunk, cropped and/or tiled before application, so long elements of the 2D kernel apply to corresponding parts of the initial matrix.

The smooth scaling map may then be applied to the noisy matrix. For example, where the initial matrix had values of one, the smooth scaling map now has an area of values with a peak at the center of the 2D kernel. When applied to the noisy matrix by elementwise multiplication, values of one will not change the noisy matrix; increased or decreased values from the 2D kernel will enhance or diminish the values of the noisy matrix, respectively. The resulting noisy image will have increased or decreased noise where the 2D kernel is located.

As discussed below, multiple 2D kernels may be combined in a single smooth scaling map.

An embodiment further comprises generating the smooth scaling map with an edge map by:

- generating an initial matrix populated by identical values;
- generating an edge for the initial matrix
- generating an edge shape;
- generating the edge map by applying the edge shape along the edge; and
- generating the smooth scaling map by applying the edge map to the initial matrix.

An embodiment generates a smooth scaling map with an edge map. An edge is a boundary between two areas; and edge map is based on an edge.

Edge detection is an important problem in computer vision, and denoising is no exception. An edge is a boundary between two areas; for denoising, it may be thought of as the boundary that separates a difference in the structure, high-frequency occurrence of noise intensities. It may be particularly useful if, for example, in radiographic images, the at least one neural network can detect where there is a boundary between background and anatomical structures.

While some edges may be a change from one area to another, other may be structures that are small, but important features. Anatomical examples include capillaries and hairline fractures. A more general denoiser may simply remove these, leaving an image that appears to look real, but actually has important details removed. By training the at least one neural network to recognize these, important details may be maintained.

To create a smooth scaling map with the edge, an initial matrix is generated with identical values, similar to the initial matrix generated for a smooth scaling map with the 2D kernel.

Next, an edge shape is generated. The edge shape determines the change in values of the neighbors of the edge. The shape of an edge may be, for example: ramp, step, roof, curve, linear slope. Examples of edges are shown below.

An edge is generated. Edge detection is a complicated problem that will not be discussed here, but the edge may be based on a detected edge, for example. An edge may take the form of, for example, a straight line, a curved line, a combination of the preceding, and be of various lengths and thicknesses. The edge map is then generated by applying the edge shape to each part of the edge, resulting in a two-dimensional area of values based about the edge. As with the 2D kernel, the values of the edge map may optionally be normalized.

The edge is then applied to the initial matrix, with its location based on the location of the selected line. The resulting matrix is the smooth scaling map.

An embodiment where the edge shape is a ramp and the selected line is a straight line may result in a smooth scaling map where elements on one size of the line are enhanced compared to elements on the other side of the line. An embodiment where the edge shape is a roof may result in a smooth scaling map where the area immediately around the line is subject to enhancement or diminishment. As applied to the noise matrix, this allows for patterns of muted and enhanced noise depending on where the edge is located.

An embodiment further comprises generating a new smooth scaling map by combining at least two existing smooth scaling maps.

Smooth scaling maps may be combined, for example, by the methods of applying one matrix to another described above. This may result in smooth scaling maps that enhance or decrease noise in particular patterns, for example, to match a human jaw.

Combined smooth scaling maps may allow the at least one neural network to better learn the noise model for specific images.

An embodiment further comprises generating the noise matrix with line scaling by:

generating values from a normal distribution for each line in the noise matrix; and applying one of the generated values to each element of the line.

In dental pantomograms, a camera is panned horizontally around a patient's head to get a full view of their jaw. This results in a horizontal smear of the noise in the image. However, the changes to the noise distribution are not typically visible to the naked eye, and so many denoisers to not account for this horizontal smear.

An embodiment of this disclosure generates values from a normal distribution for each line of a noise matrix, then applies the generated values to each element of each line. This results in a noise matrix that varies from line to line, allowing the at least one neural network to learn to denoise similarly noisy images.

An embodiment, where the at least one neural network is an encoder-decoder, further comprises:

encoding the images of the first type and/or the second type through at least one encoder, where each encoder comprises at least one convolutional layer and at least one downsampling; and decoding data based on output of at least one of the at least one encoder through at least one decoder, where each decoder comprises at least one convolutional layer and at least one upsampling, and the output of each decoder is intermediate data, denoised images, and/or true images.

One type of neural network architecture is an encoder-decoder, where an encoder encodes an input image into intermediate data, while a decoder decodes the intermediate data into an output image that is similar to the input image. Encoding may be thought of as converting an object into code, i.e., some other variables that represent it, and decoding may be thought of as trying to restore the original object from those variables.

An encoder-decoder may allow for a modified version of the original data to be returned, for example, converting a noisy image into a less noisy one. Where there are multiple encoders, the encoders may be sequential, that is, the input of one is based on the output of an earlier encoder.

In this disclosure, an encoder is comprised of at least one convolutional layer and at least one downsampling. For encoders, each convolutional layer is comprised of at least one convolution and at least one activation function.

A convolution is comprised of at least one filter that may be run over each element of a matrix, generating as output a convolved image for each filter. For an explanation of convolutions, see Bai 2019. Convolution may be padded or unpadded. An unpadded convolution is run over the entire image as-is, meaning that the edge pixels are not convolved because they do not have enough neighbors to fill out the convolution. Unpadded convolution results in output smaller than the original input. A padded convolution is run over every pixel in the image, and the missing neighbors are replaced with a filler value, such as zero. Padded convolution results in output of the same size as the input.

An activation function defines the output of the convolution layer based on the inputs; it is. Examples of activation functions include: sigmoid, ReLu, swish, mish. In an embodiment, ReLu functions may be paired with convolutions.

The decoder uses filters to learn about its input, then generates output via the activation function when a particular filter is relevant. The activation function changes as the neural network is in training, and is frozen once the neural network is trained. A neural network using convolutions may be more efficient than a fully-connected neural network, since only sufficiently important connections are used, resulting in fewer connections overall.

Multiple convolutions may be sequentially applied. Examples are detailed below.

Downsampling means reducing the sampling rate. This may be accomplished for example, by: pooling including MaxPool, decimation, strides. The end result is a less detailed data based on the image, allowing less detailed features of the image to be learned by the at least one neural network. The output of the downsampling layer is then input into a subsequent encoder.

The presence of downsampling in the at least one encoder allows the at least one neural network to learn about the image at different levels of detail at the training stage, and apply this knowledge with the dental image once trained. For example, for a dental pantomogram, an earlier encoder at a higher level of detail may learn that the image has a metal implant, and subsequently give the filters recognizing the implant more weight. However, after downsampling, a subsequent encoder at a lower level of detail may recognize the image overall as a jaw and correctly weight it as such. Examples are discussed below.

A decoder is comprised of at least one convolutional layer and at least one upsampling.

For decoders, each convolutional layer is comprised of: at least one convolution and/or at least one deconvolution, and at least one activation function. A convolution is described above, for the encoder. A deconvolution is similar to a convolution in that filters are used to pass over an image. However, instead removing detail and distilling information, the deconvolution fills in details and predicts information. Deconvolution transposes the convolutions, and with the use of padding, results in images of the same size or larger.

At least one activation function is described above for the convolutional layer. Here, it is trained to respond to the convolution and or deconvolution, selecting the correct filters to emphasize, allowing it to fill in details of the image given new inputs.

The output of the decoder during the training stage may be a denoised image or intermediate data. In the training state, the denoised image is compared to the corresponding true image and the at least one neural network, including the decoder, is adjusted according to those results. The denoised image may also be the final output of a trained neural network, subject to optional post-processing. If the output of the decoder is intermediate data, it may be further processed through another decoder.

Upsampling increases the sampling rate. Upsampling may be thought of as an interpolation—the upsampling layer may expand the input it is given, and guess at what the pixels in between its input are. The output of the upsampling layer is larger than its input.

In summary, the encoder-decoder architecture denoises an image by using the encoder to reduce detail and learn which features are important, then using the decoder to increase detail and generate a denoised image based on what it has learned a true image should look like.

In an embodiment, the at least one neural network further comprises at least one upsampling.

While upsampling and downsampling may be part of encoders and decoders respectively, they may also occur outside of those. This allows the image needs to reach a certain size without requiring further processing through convolutions.

An embodiment further comprises:

combining at least two sources of input; and decoding the combined at least two sources of input with at least one of the at least one decoder.

While downsampling may be useful for learning features of an image at a lower level of detail for the encoders, reconstructing the image through the decoders may suffer from the lack of detail and generate less accurately denoised image. An embodiment allows a decoder to learn from multiple sources of data, mitigating this problem.

First, two sources of input are combined. A source of input may be, for example: an image, output from a decoder, encoder, preprocessing, downsampling, and/or an upsampling. The sources of input may be combined as matrices, as described above. The sources of input may be combined in such a way that their representations of the underlying object accurately overlap.

For example, a first source of input may be the output of an encoder and the second source of input may be the output of another decoder, and the outputs may be combined by concatenation, with the larger image cropped to fit the smaller one.

The combined sources of input are then decoded by the decoder. This allows for decoding based on different levels of detail. For example, output from an earlier encoder may have a feature that has been removed by subsequent encoders, but lack information on the overall shape of the underlying object. By combining this output with an upsampling after a subsequent decoder, both sources of information may be used in a decoder, resulting in more accurate denoising.

Combining sources of data may be particularly useful as part of a neural network architecture where a decoder's original input is from an upsampling, and a second source of input is from an encoder whose output corresponds in the size of the representation of the underlying object. This allows features to be passed on at different levels of detail. It may also be useful to have several decoders with multiple sources of input, as the upsampling layers in between would have better predictions to upsample from.

An embodiment further comprises:

preprocessing the images before a first encoder of the at least one neural network with at least one convolutional layer;

postprocessing the images after a final decoder of the at least one neural network with at least one convolutional layer and/or at least one map pooling layer; and using input for the postprocessing based on output of the preprocessing.

In an embodiment, preprocessing comprises at least one convolutional layer, and allows for the at least one neural network to be trained on the input image directly before downsampling. This means that at least part of the at least one neural network is trained on the entire image, and therefore, all details of the original. Preprocessing occurs prior to the first encoder.

Postprocessing comprises at least one map pooling layer and/or at least one convolutional layer. A map pooling layer may be used that reduces the number of feature maps, making further processing faster, since there are fewer feature maps to run through. A map pooling layer may be, for example, a 1×1 convolution. A convolutional layer in postprocessing is similar to a convolutional layer in a decoder, in that it comprises at least one convolution or deconvolution and an activation function. Postprocessing occurs after the final decoder, and a convolutional layer in postprocessing allows the at least one neural network to learn what features from the output of the final decoder.

In using the preprocessing output as a source of input for postprocessing, whether directly or through residual block(s), the at least one neural network trains its final output with details from the original image. This may allow for corrections of inaccurate denoising from previous encoding and decoding.

An embodiment where the at least one neural network comprises at least one residual block, the method further comprising:

processing data through the at least one residual block, where each residual block comprises at least one convolutional layer, and is located between a corresponding decoder and a corresponding encoder or between the preprocessing and the postprocessing.

An embodiment uses residual blocks, allowing the at least one neural network to train output of preprocessing or an encoder before passing the output on to postprocessing or a corresponding decoder, respectively. Adding residual blocks to the at least one neural network to learn which features to pass on may result in more accurate denoising.

A residual block comprises at least one convolutional layer. A residual block's input may be the image itself, output of preprocessing, an encoder, and/or another residual block. Output of a residual block may be used as input for another residual block, a decoder, and/or postprocessing. Residual blocks may be used alone or in series. Examples of residual block architecture are shown below.

It should be noted that one features of a residual block is that when using the residual block does not improve performance, the residual block's activation functions set all their weights to zero, and the output of the residual block is the same as the input.

An embodiment where the at least one neural network comprises at least two sets of residual blocks, further comprises:

using output of an earlier encoder as input for an earlier set of at least two residual blocks, and output of the earlier set is used as input for a decoder corresponding to the earlier encoder; and using output of a subsequent encoder as input for a subsequent set of at least one residual block, but fewer residual blocks than the earlier set, and output of the subsequent set is used as input for a decoder corresponding to the subsequent encoder.

An embodiment uses a pyramid structure for its residual blocks, where encoders at higher levels of detail have more residual blocks than encoders at lower levels of detail. This allows more training where there are more features, and less training where there are less features, resulting in more accurate denoising.

A simple embodiment may have two sets of residual blocks, an earlier set for an earlier encoder and a subsequent set for a subsequent encoder. The earlier set may comprise two residual blocks in a series, a first residual block and a second residual block. The first residual block uses an earlier encoder's output as input, and its output is input to the second residual block. The second residual block's output may be a source of input for a corresponding decoder, which is a decoder that would have used the earlier encoder as a source of input.

The subsequent set may comprise a single residual block, where the single residual block's input is the subsequent encoder's output, and its output is used as input for a decoder corresponding to the subsequent encoder.

Multiple sets of residual blocks may increase the accuracy of the denoising, by learning more features where there is more detail, and less features where there is less. Although the simple embodiment discussed above has only two sets of residual blocks, there may be more, with each subsequent set having fewer residual blocks than the earliest set. Further examples are described below.

An embodiment where the at least one neural network further comprises a preprocessing-postprocessing set of residual blocks further comprises:

using output of the preprocessing as input for the preprocessing-postprocessing set of residual blocks, comprising more residual blocks than the set of residual blocks corresponding to the earliest encoder; and using output of the preprocessing-postprocessing set of residual blocks as basis for input of the postprocessing.

An embodiment adds preprocessing and postprocessing to the pyramid structure, where the series of residual blocks between preprocessing and postprocessing has the highest number of residual blocks in the at least one neural network. This allows features learned from the original image to be passed on to processes much closer to the final output.

An embodiment further comprises a computer program product in a non-transitory medium configured, when run, to execute the method of one or more of the preceding claims.

BRIEF DESCRIPTION OF THE SEVERAL VIEWS OF THE DRAWINGS

The above and/or additional objects, features and advantages of the present disclosure, will be further described by the following illustrative and non-limiting detailed description of embodiments of the present disclosure, with reference to the appended drawing(s), wherein:

FIG. 3 shows an embodiment of a dental pantomogram denoised with a trained neural network by the method described in FIG. 2;

FIG. 3A is an original dental pantomogram;

FIG. 3B is the dental pantomogram of 3A, denoised by the method described in FIG. 2;

FIG. 3C shows the noise removed from FIG. 3A, resulting in FIG. 3B;

FIG. 4 shows embodiments of different types of dental images;

FIG. 6 shows embodiments of probability distributions and the noise matrices they generate;

FIG. 6A shows a uniform distribution 601 and uniform noise matrix 602;

FIG. 6B shows a Gaussian noise distribution 603 and a Gaussian noise matrix 604.

FIG. 6C shows Poisson distribution 605 and Poisson noise matrix 606.

FIG. 8 shows embodiments of different blurring kernels;

FIG. 9 shows embodiments of 2D kernels generated for smooth scaling maps;

FIG. 11 shows embodiments of smooth scaling maps;

FIG. 16 shows embodiments of different placements of a residual block;

DETAILED DESCRIPTION OF THE INVENTION

In the following description, reference is made to the accompanying figures, which show by way of illustration how the disclosure may be practiced.

Figure 1:
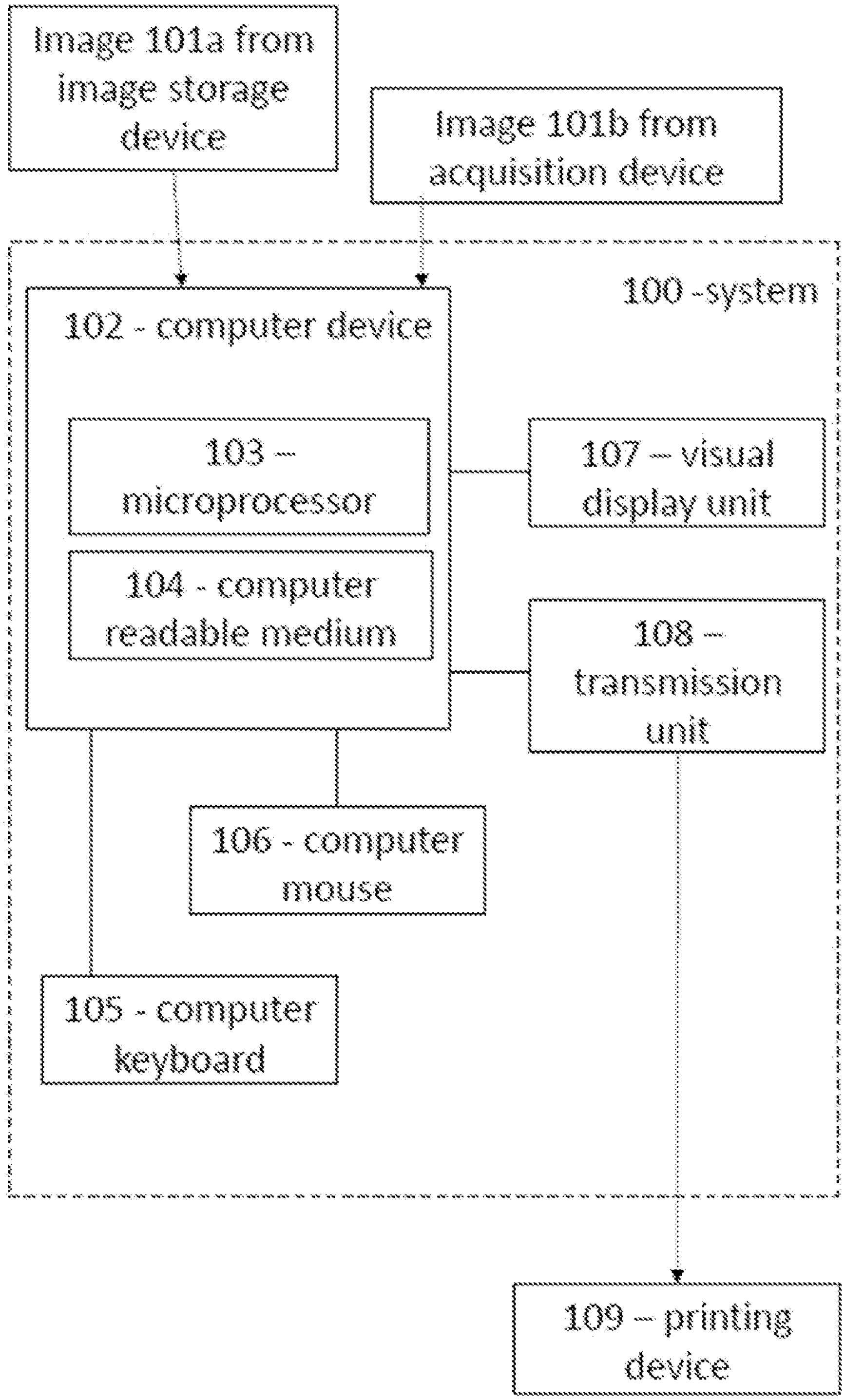
FIG. 1 shows a schematic of a system according to an embodiment of the disclosure.

FIG. 1 shows a schematic of a system according to an embodiment of the disclosure. The system 100 comprises a computer device 102 comprising a computer readable medium 104 and a microprocessor 103. The system further comprises a visual display unit 107, an input unit such as a computer keyboard 105 and a computer mouse 106 for entering data and activating virtual buttons visualized on the visual display unit 107. The visual display unit 107 may for example be a computer screen.

The computer device 102 is capable of receiving noisy reconstructed dental images 101*a* that is not directly connected to a dental image acquisition device. It is capable of receiving any reconstructed dental Image for example a noisy panoramic image. Images may be stored in the computer readable medium 104 and provided to the processor 103.

Additionally or alternatively, the computer device 102 is further capable of receiving a dental image, for example, a noisy panoramic image 101*b* from a scanning device, such as X1 scanner manufactured by 3shape, or capable of receiving any reconstructed dental image. The received image can be stored in the computer readable medium 104 and provided to the microprocessor 103.

The system 100 is configured to allow an operator to denoise noisy dental images through machine learning.

The system comprises a transmission unit 108 for storing and transmitting the result of the system 100. The result may also be visualized at the display unit 107. The unit for transmitting can be a wired or a wireless connection, and the transmission may be done for example using the internet or File Transfer Protocol (FTP).

The acquisition of a noisy dental image 101*a* may be performed at a dentist that has the system 100 or at another dentist or facility with an image acquisition device. In the latter case the dental image can be provided via an internet connection between the facility that acquired the image and the facility that will perform the processes of system 100.

The system 100 as shown is an illustrative example. For example, the computer device 102 may comprise more than one microprocessor 103 and/or more than one computer readable medium 104, the visual display unit 107 may be integrated in the computer device 102 or be separate from the computer device 102, etc.

FIG. 1 shows a schematic of a system according to an embodiment of the disclosure. The system 100 comprises a computer device 102 comprising a computer readable medium 104 and a microprocessor 103. The system further comprises a visual display unit 107, an input unit such as a computer keyboard 105 and a computer mouse 106 for entering data and activating virtual buttons visualized on the visual display unit 107. The visual display unit 107 may for example be a computer screen.

The computer device 102 is capable of receiving noisy reconstructed dental images 101*a* that is not directly connected to a dental image acquisition device. It is capable of receiving any reconstructed dental image, for example, a noisy panoramic image. Images may be stored in the computer readable medium 104 and provided to the processor 103.

Additionally or alternatively, the computer device 102 is further capable of receiving a dental image, for example, a noisy panoramic image 101*b* from a scanning device, such as X1 scanner manufactured by 3shape, or capable of receiving any reconstructed dental image. The received image can be stored in the computer readable medium 104 and provided to the microprocessor 103.

The system 100 is configured to allow an operator to denoise noisy dental images through machine learning.

The system comprises a transmission unit 108 for storing and transmitting the result of the system 100. The result may also be visualized at the display unit 107. The unit for transmitting can be a wired or a wireless connection, and the transmission may be done for example using the internet or File Transfer Protocol (FTP).

The system may comprise a printing device 109.

The acquisition of a noisy dental image 101*a* may be performed at a dentist that has the system 100 or at another dentist or facility with an image acquisition device. In the latter case the dental image can be provided via an internet connection between the facility that acquired the image and the facility that will perform the processes of system 100.

The system 100 as shown is an illustrative example. For example, the computer device 102 may comprise more than one microprocessor 103 and/or more than one computer readable medium 104, the visual display unit 107 may be integrated in the computer device 102 or be separate from the computer device 102, etc.

Figure 2:
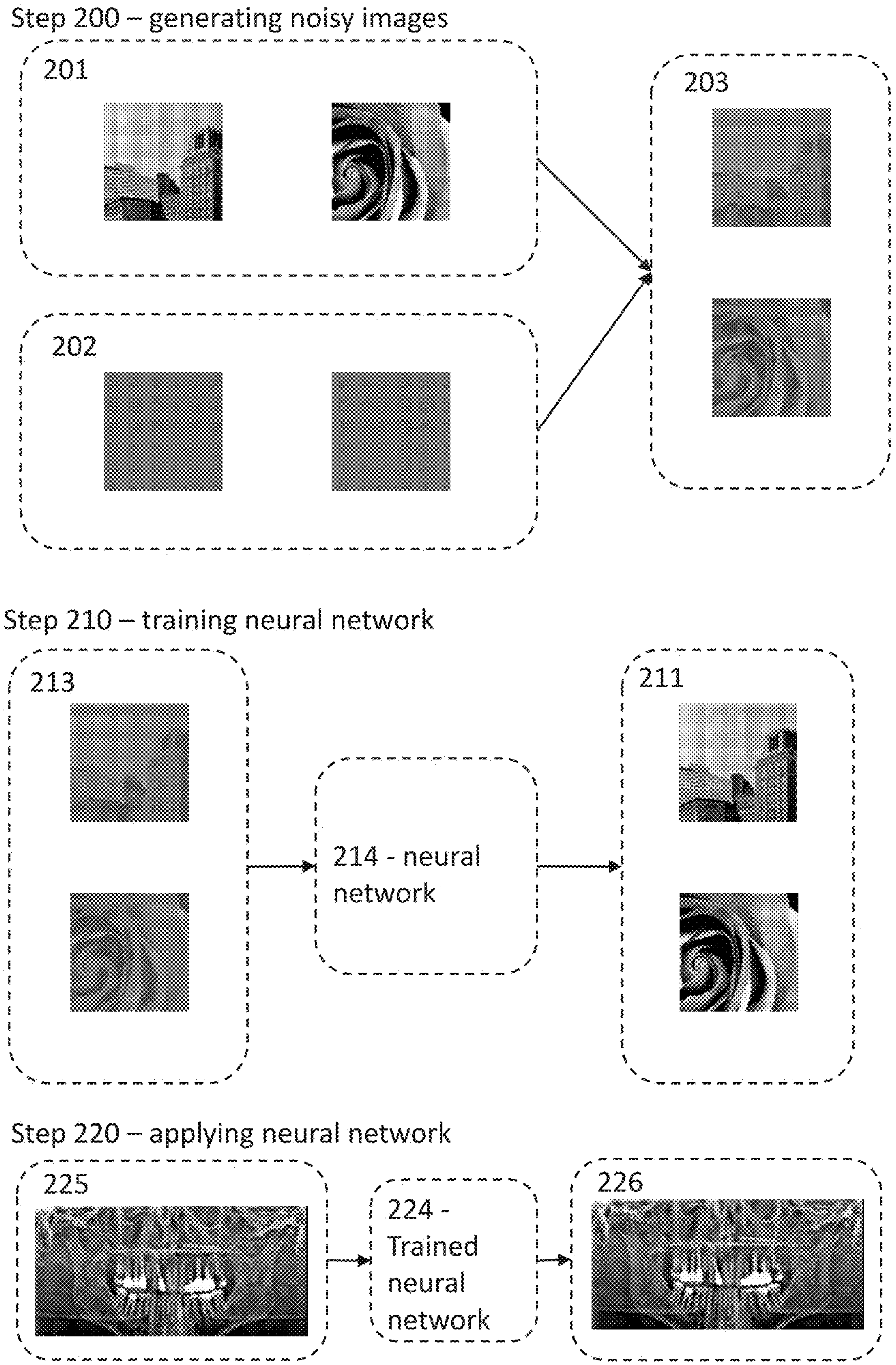
FIG. 2 illustrates an embodiment of workflow for training and using a denoiser with domain adaptation.

FIG. 2 illustrates an embodiment of workflow for training and using a denoiser with domain adaptation.

Step 200 generates noisy images by combining true images 201 with generated noise 202 into noisy images 203. The true images 201 may be any type of sufficiently detailed image. Here, high-resolution grayscale photographs have been used; color photos may also be used, by splitting the colors into red, green, and blue channels.

The noise 202 is generated, for example, by a noise matrix as described above. This process is discussed further in FIG. 5-12 below.

The noisy images 203 may be generated from a combination of true images 201 and noise 202. This combination may happen by procedures similar to those discussed for applying matrices; they may be, for example, concatenated, multiplied, and/or a combination of the two; stretched and/or cropped to fit each other, and so on. If the combined value of a pixel from the true image and its corresponding pixel from the noise matrix is outside the range of possible values, the nearest value within that range is assigned.

Step 210 trains the at least one neural network, here neural network 214 to output denoised images of the first type, here denoised images 211 from noisy images 213 (i.e., 203 from step 200). A neural network is trained by changing the weights of activation functions, based on optimizing results. Here, the goal is to output denoised images 211 to be as similar as possible as the corresponding true images 201. Similarity may be measures by measures including but not limited to: SSIM, PSNR, ALED. Details of embodiments of the neural network are discussed in FIG. 13-21 below.

Step 220 applies the neural network to a dental image of a second type, here dental pantomogram 225. Dental pantomogram 225 is input into the trained neural network 224, which was trained in step 210, and the output of trained neural network 224 is denoised dental pantomogram 226.

Using the embodiment described here may be particularly useful where a true image cannot be taken directly, for example, in dental pantomograms. Typically, a neural network requires true images to train. However, as discussed below, this is not possible in this instance.

Dental pantomograms need to be taken quickly to limit the amount of radiation exposure to the patient. However, even at increased radiation doses, dental pantomograms are naturally noisy-temperature changes would change the tube/sensor configuration and cause blurring. The focal spot in the tube could drift and the sensor sensitivity could change. Also, there was areas of the sensor which could saturate the electronic counters.

A typical method to find more accurate images where the images are inherently noisy is to combine many of them to find an average. However, averaging many low dose images in this situation does not work, because photon scattering creates blurring in the images. Hence, domain adaptation with noise generated with features based on noise particular to the problem is a novel and nonobvious solution to this longstanding problem.

FIG. 3 shows an embodiment of a dental pantomogram denoised with a trained neural network by the method described in FIG. 2.

FIG. 3A is an original dental pantomogram. In the overall view in image 301, horizontal smearing typical to dental pantomograms can be seen; in expanded view 302, noise can be seen, particularly over relevant anatomical structures like the roots of the teeth.

FIG. 3B is the dental pantomogram of 3A, denoised by the method described in FIG. 2. The overall view in image 303 shows less horizontal smearing than image 301, but not so much smoothing that important details are removed. The expanded view in image 304 shows less noise that image 302, especially around the roots of the teeth.

FIG. 3C shows the noise removed from FIG. 3A, resulting in FIG. 3B. In the overall view in image 305, it can be seen that the noise removed has a striped appearance, that is, has a lot of the horizontal variance removed by the line scaling described above. Further, a smooth scaling map with 2D gaussian kernels detected more noise in the center of the image, where the camera stays for longer relative to the anatomy shown, and removed more noise there accordingly. In the expanded view 306, it can be seen that the noise is removed from the anatomical details, but due to an edge-based smooth scaling map, does not denoise from the bright and overexposed areas of the zirconia false teeth.

FIG. 4 shows embodiments of different types of dental images.

Image 401 is an infrared image of an oral situation.

Image 402 is a fluorescence image of an oral situation.

Image 403 is a dental pantomogram, a type of radiographic image.

Figure 5:
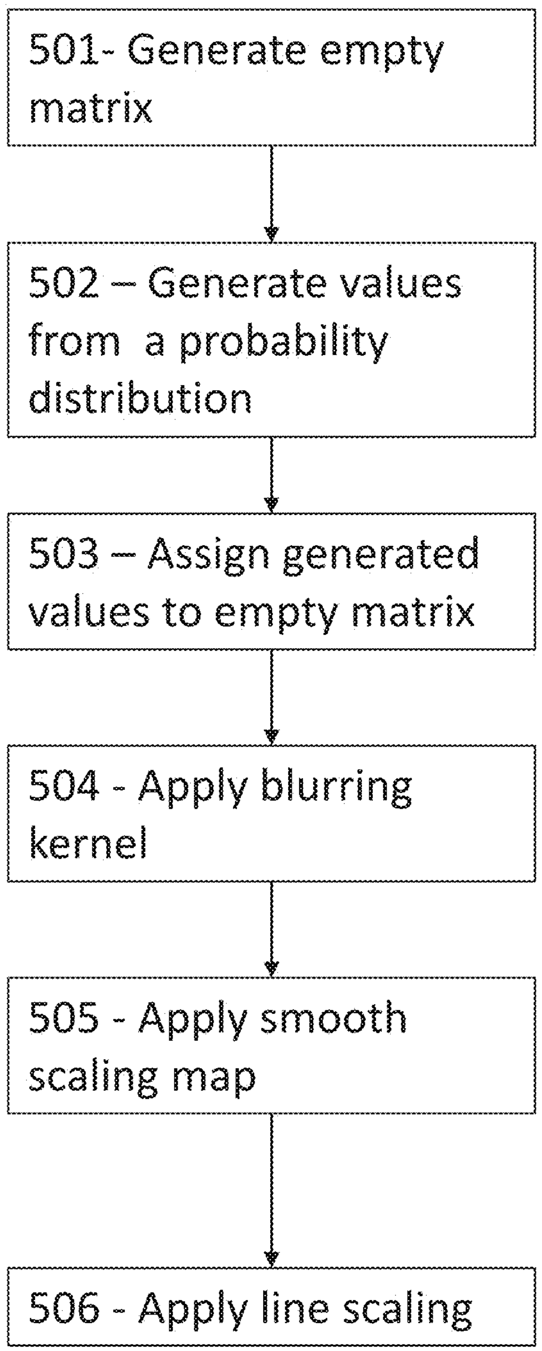
FIG. 5 is an embodiment of a method of creating a noise matrix.

FIG. 5 is an embodiment of a method of creating a noise matrix.

Step 501 generates an empty matrix.

Step 502 generates values from a probability distribution. FIG. 6 describes some of the probability functions that may be used, for example, a Gaussian distribution, a uniform distribution, or a Poisson distribution. Other distributions may also be used, for example, an impulse distribution.

Step 503 assigns the generated values to the empty matrix, resulting in a noise matrix. This may be used to generate noisy images, and often, a Gaussian noise model as generated in steps 501 to 503 is used. However, because all noise is not identical, the noise model can be improved to better emulate the noise it is trying to remove, in steps 504 to 506.

Step 504 applies a blurring kernel to the noise matrix. Examples of blurring kernels can be seen in FIG. 8. As described above, a blurring kernel smooths over the image by altering each pixel according to the values of its neighbors. This results in a more realistic noise model, as in reality, neighboring pixels often have similar levels of noise.

Step 505 applies a smooth scaling map to the noise matrix, by a method described above. Examples of smooth scaling maps can be seen in FIG. 11. See, e.g., FIG. 3, image 301. As discussed above, the allows the noise model to more accurately capture variations in noise level across the image.

Step 506 applies line scaling to the noise matrix. For some images, such as dental pantomograms, the noise has significant differences in line-by-line variance. Applying line scaling allows to the noise model to emulate this.

These steps combined may allow for a more accurate noise model, one that allows for the removal of noise by training the at least one neural network to remove them.

FIG. 6 shows embodiments of probability distributions and the noise matrices they generate.

FIG. 6A shows a uniform distribution 601 and uniform noise matrix 602. A uniform distribution gives any of the values within its range an equal chance of being selected; thus, noise matrix 602 a more even distribution as compared to noise matrices 604 and 606.

FIG. 6B shows a Gaussian noise distribution 603 and a Gaussian noise matrix 604. Gaussian distributions are popular for use in noise models because Gaussian distributions are found so often in nature. In a Gaussian distribution, the mean values is the most common, and thus more likely to be sampled. Hence, Gaussian noise matrix 604 has more values near the middle of the spectrum, compared to noise matrix 602.

FIG. 6C shows Poisson distribution 605 and Poisson noise matrix 606.

Figure 7:
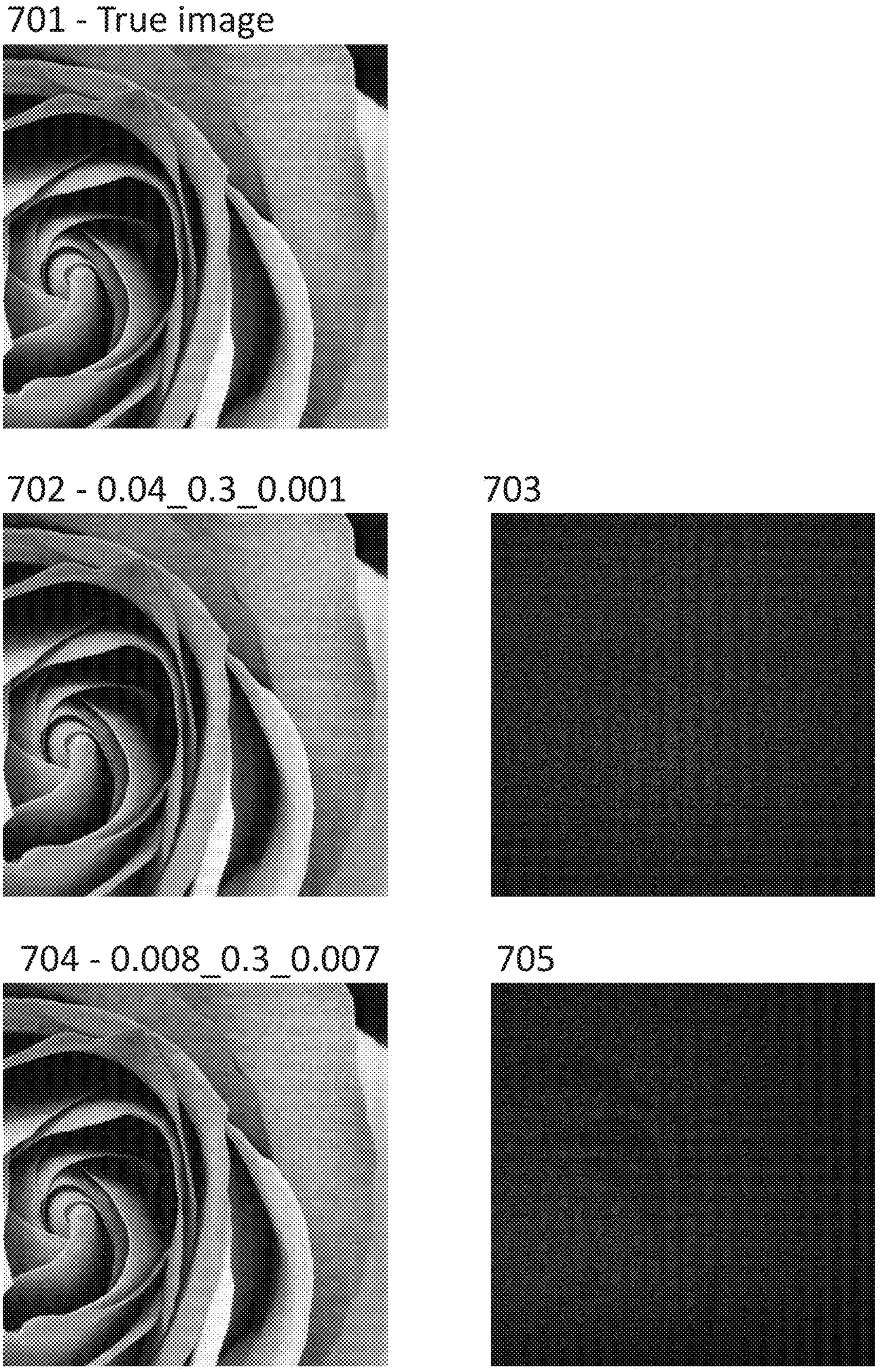
FIG. 7 shows embodiments of different noise matrices applied to the same image.

FIG. 7 shows embodiments of different noise matrices applied to the same image.

Image 701 is the original image.

Image 703 is a noise matrix generated from a Gaussian distribution of parameters x, x, and x. It is visually represented in gray scale, rather than by numbers. Concatenating noise matrix 703 to image 701 results in noisy image 702.

Image 705 is a noise matrix generated from a Gaussian distribution of parameters x, x, and x. Concatenating noise matrix 705 to image 701 results in noisy image 704.

Generated noisy images such as images 702 and 704 may be used to train the at least one neural network, as described above. Although noise matrices 703 and 705 here are Gaussian noise distributions, as described above and below, the noise matrix can be much more sophisticated, more accurately depicting noise.

FIG. 8 shows embodiments of different blurring kernels. As described above, these are kernels that may be applied to an image to reduce local variation, which more accurately emulates real noise.

Blurring kernel 801 is a blurring kernel of minimum size, 2×1. When applied to an image, it takes the value of a pixel and changes it in accordance with the neighboring pixel to the right, where the neighboring pixel's value is weighted at half of the original pixel.

Blurring kernel 802 is a box blurring kernel. The center cell is applied to the selected pixel. The selected pixel is then replaced with the average of its eight nearest neighbors.

Blurring kernel 803 is a Gaussian blurring kernel. Here, a two-dimensional Gaussian distribution is discretized into a 5 by 5 matrix. The center cell is where the Gaussian distribution peaks. The center cell may be applied to the selected pixel, and its neighboring pixels weighted according to the values of their corresponding cells in the blurring kernel. The selected pixel is then replaced with this weighted average, resulting in less heavy blurring than the box blurring kernel 802, but local variation reduced.

FIG. 9 shows embodiments of 2D kernels generated for smooth scaling maps.

Kernel 901 is a Gaussian kernel of parameters:

Horizontal mean=0.5, vertical mean=2

Horizontal variance=6400, vertical variance=6400

As the horizontal variance and vertical variance are the same, this 2D kernel is roughly circular.

Kernel 902 is a Gaussian kernel of parameters:

Horizontal mean=0.5, vertical mean=1 horizontal variance=800, vertical variance=1600

As the horizontal and vertical variance differ here, the 2D kernel generated is roughly elliptical. Note also that, as the variances have smaller values than for kernel 902, the 2d kernel is smaller.

Figure 10:
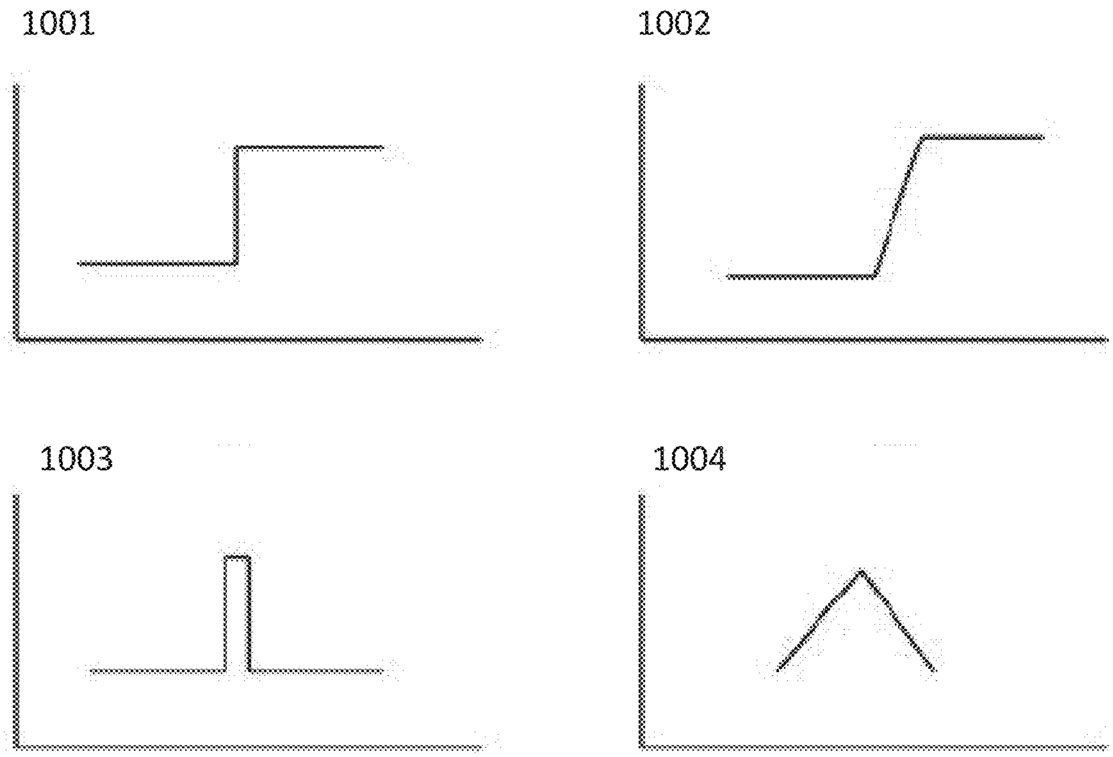
FIG. 10 shows embodiments of edge shapes to be applied to edges.

FIG. 10 shows embodiments of edge shapes to be applied to edges.

Edge shape 1001 is a step edge, where the transition from noise level to another is abrupt.

Edge shape 1002 is a ramp edge, where the transition from one noise level to another is more gradual.

Edge shapes 1001 and 1002 allow transitions between noise levels to be marked, for example, the edge between background and the object being X-rayed, or the edge between material. Examples of this occurs in FIG. 3 above, and can be seen very clearly, for example, in the edge between a zirconia veneer and the gum and bone next to it.

Edge shape 1003 is a line edge, where there is an abrupt transition to a different noise level before returning to the original noise level.

Edge shape 1004 is a roof edge, where there is a more gradual transition to a different noise level before returning to the original noise level.

Edge shapes 1003 and 1004 allow for lines to be preserved rather than being denoised. This may be particularly important for medical applications, where small details such as burst capillaries or hairline fractures may be denoised by a more general denoising algorithm.

FIG. 11 shows embodiments of smooth scaling maps.

Smooth scaling maps 1101 and 1102 are both combinations of the 2D Gaussian kernels from FIGS. 9, 901 and 902. As can be seen here, by combining multiple Gaussian kernels, different shapes may be generated for the noise matrices, and learned by the neural network.

Figure 12:
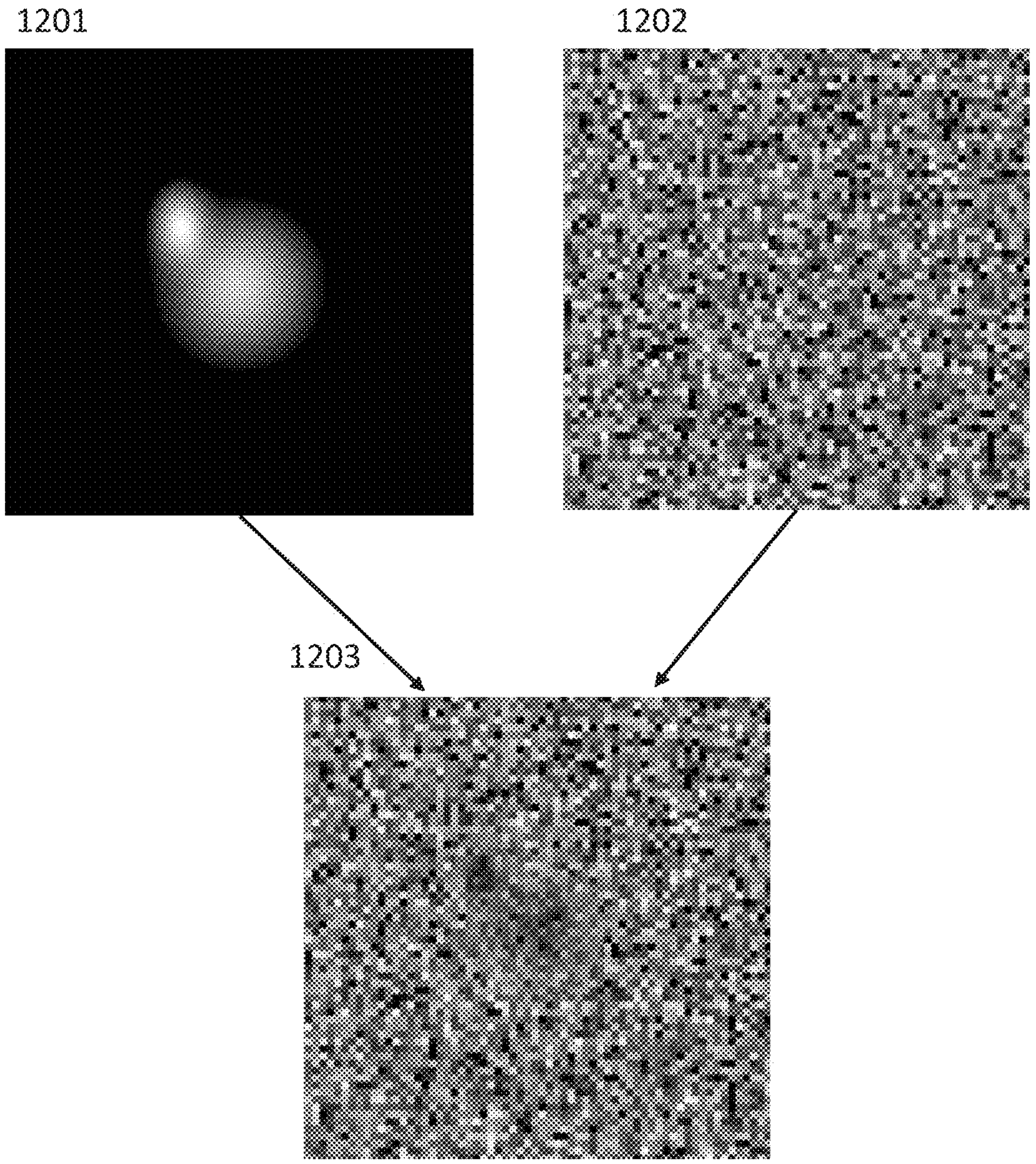
FIG. 12 shows an embodiment of how a smooth scaling map may be applied to a noise model.

FIG. 12 shows an embodiment of how a smooth scaling map may be applied to a noise model.

Smooth scaling map 1201 is the smooth scaling map generated from FIG. 11, 1101. Gaussian noise matrix 1202 is the noise matrix generated in FIG. 6, 604. Smoothed noise matrix 1203 is the result of concatenating the smooth scaling map 1201 and Gaussian noise matrix 1202. Note that the 2D Gaussian kernels mute the variance of the noise where they are located. The smooth scaling map may also be reversed, where background noise is muted and the noise within the 2D kernels is left as is or enhanced.

Figure 13:
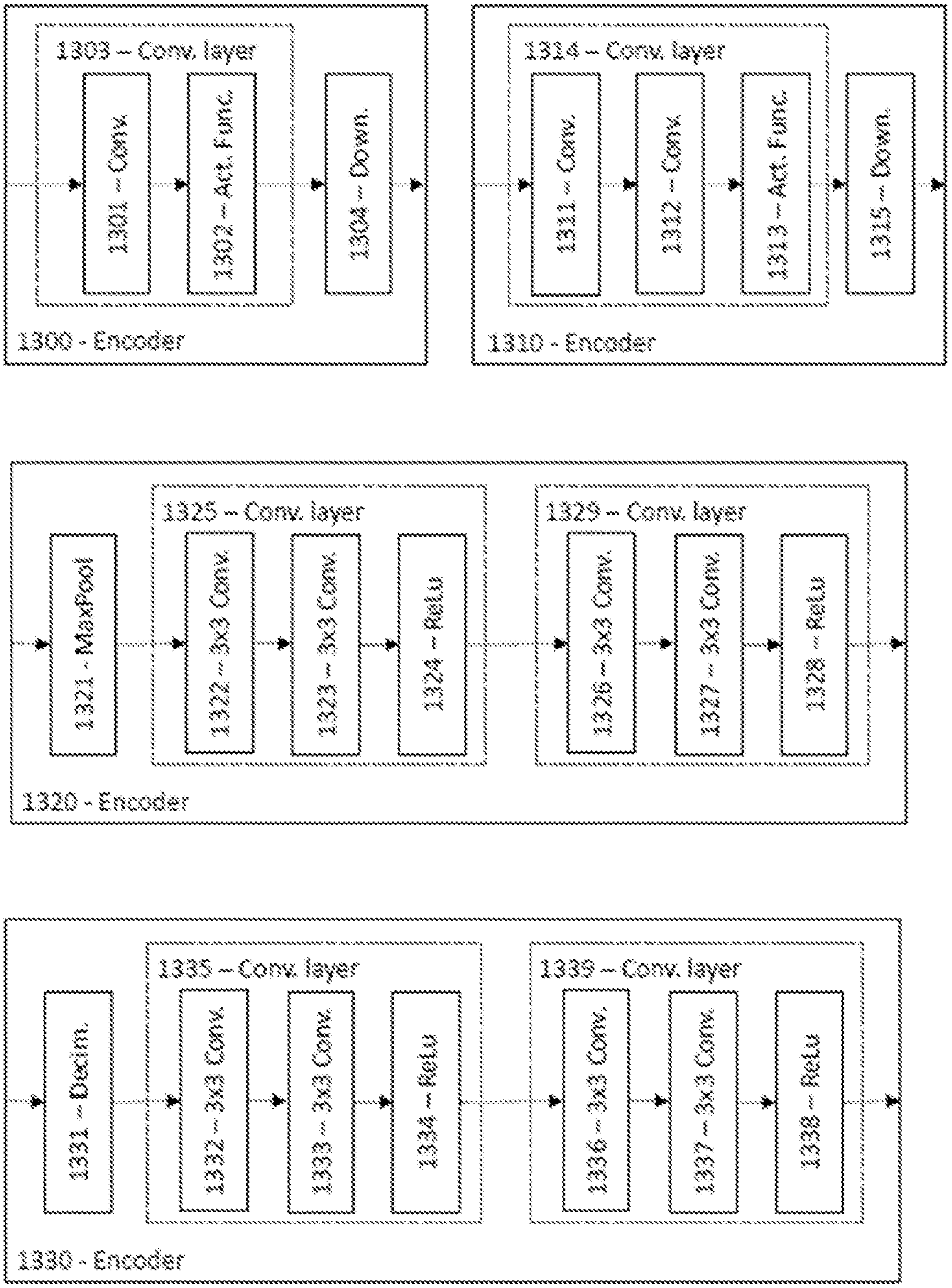
FIG. 13 shows embodiments of encoders with details on their operations.

FIG. 13 shows embodiments of encoders with details on their operations.

Encoder 1300 is an encoder with a convolutional layer 1303 and a downsampling 1304. Convolutional layer 1303 comprises a convolution 1301 and an activation function 1302. Input would be processed through each of these layers according to the arrows.

Encoder 1310 is an encoder with a convolutional layer 1314 and a downsampling 1314. Convolutional layer 1314 comprises convolutions 1311 and 1312 and activation function 1313.

Encoder 1320 is an encoder with a downsampling 1321 and two convolutional layers 1325 and 1329. The downsampling here is a MaxPool, that is, selecting the maximum value out of the pool of neighboring values. This may reduce noise by leaving out the lowest values, where noise tends to have amplified effect. The convolutional layers 1325 and 1329 are each comprised of two 3×3 convolutions (1322, 1323, 1326, 1327) and an activation function (1324, 1328). The activation function here is a ReLu unit.

Encoder 1330 is an encoder with a downsampling 1331 and two convolutional layers 1335 and 1339. The downsampling here is a decimation. Decimation allows for more sensitive denoising than MaxPool, preserving low value structures that may turn out to be important details of the image. The convolutional layers 1325 and 1329 are each comprised of two 3×3 convolutions (1322, 1323, 1326, 1327) and an activation function (1324, 1328). The activation function here is a ReLu unit.

Figure 14:
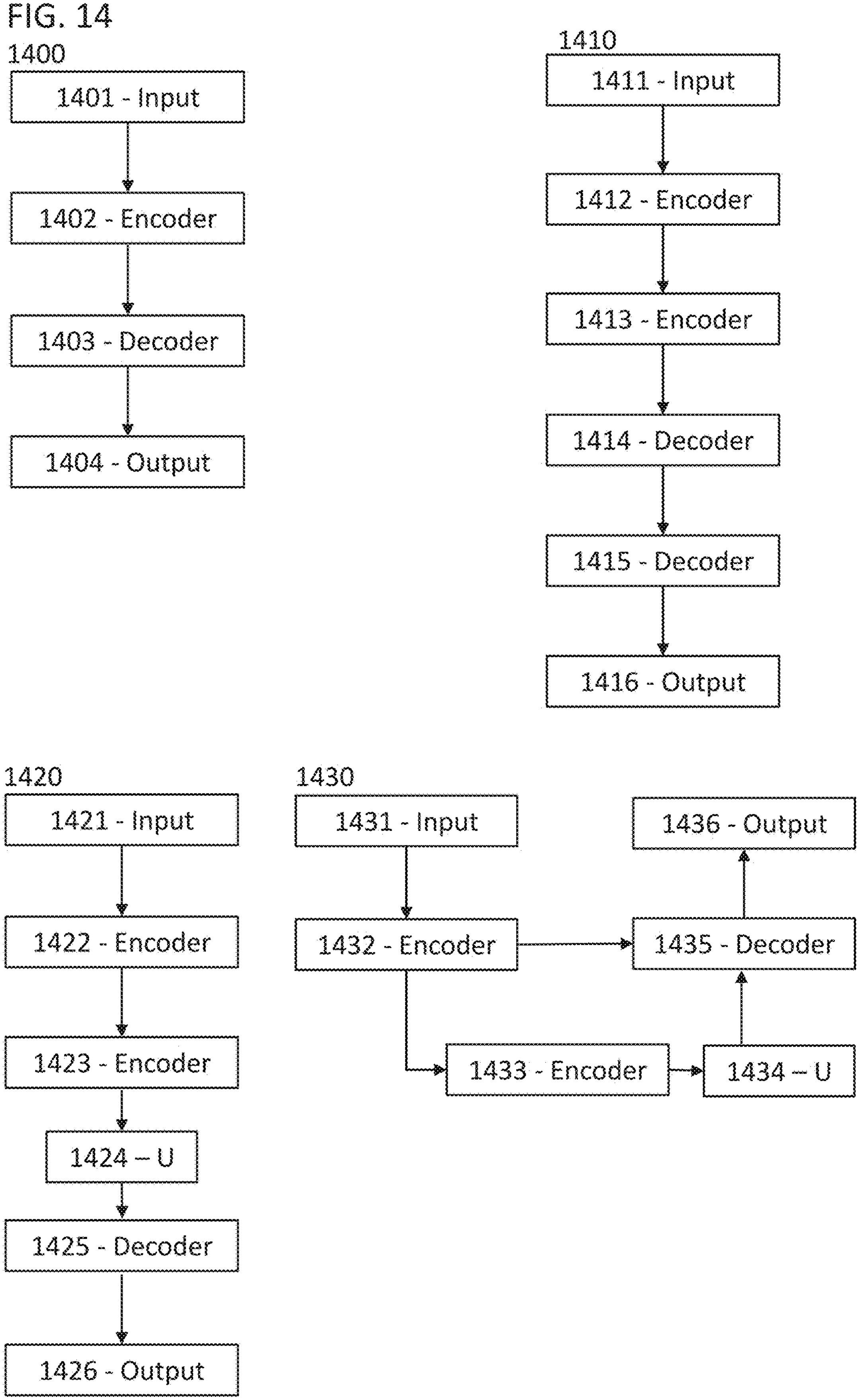
FIG. 14 shows embodiments of encoder-decoders.

FIG. 14 shows embodiments of encoder-decoders.

Encoder-decoder 1400 shows an encoder-decoder with a single encoder and a single decoder. Input 1401 may be a two-dimensional image. Input 1401 is input into Encoder 1402, the output of which is input into decoder 1403, which outputs output 1404. If the encoder and decoder downsample and upsample by the same ratio, then the output image is equal in size to the input image.

Encoder-decoder 1410 shows an encoder-decoder with two sequential encoders and two sequential decoders. Input 1411 is input into encoder 1412, whose output is in turn input into encoder 1413. An encoder 1413, the encoder-decoder switches to decoding, and the output of encoder 1413 is used as input for decoder 1414. The output of decoder 1414 is then used as input for decoder 1415, and the output 1416 of decoder 1415 may be the final image. Encoder-decoder 1410 has two levels of detail at which the input 1411 may be encoded.

Encoder-decoder 1420 shows an encoder-decoder with two encoders, a decoder, and an upsampling layer. Input 1421 is input into encoder 1422, whose output is in turn input into encoder 1423. At encoder 1423, the encoder-decoder switches to decoding, and the output of encoder 1423 is used as input for upsampling 1424. The output of upsampling 1424 is then used as input for decoder 1425, and the output 1426 of decoder 1425 may be the final image. Encoder-decoder 1420 has two levels of detail at which the input 1421 may be encoded.

Upsampling 1424 here is used in lieu of a second decoder; although it predicts values to return the data to a larger image size, it cannot be trained to improve its performance. If upsampling 1424 were absent, the encoder-decoder would still return an image, albeit at a smaller size and resolution than the original.

Encoder-decoder 1430 shows an encoder-decoder with two encoders, a decoder, and an upsampling layer. Input 1431 is input into encoder 1432, whose output is in turn input into encoder 1433. At encoder 1433, the encoder-decoder switches to decoding, and the output of encoder 1433 is used as input for upsampling 1434. The output of upsampling 1434 is then combined with the output of encoder 1432 to be used as input for decoder 1435, and the output 1436 of decoder 1435 may be the final image.

Encoder-decoder 1430 has two levels of detail at which the input 1431 may be encoded.

Encoder-decoder 1430 is similar encoder-decoder 1420, but with two sources of input for the decoder. This is possible in part because encoder 1432 is at the same level of detail the output of upsampling 1434, and they can be concatenated or otherwise combined. As discussed above, this allows features from a more detailed image to be passed on to a later decoder.

Figure 15:
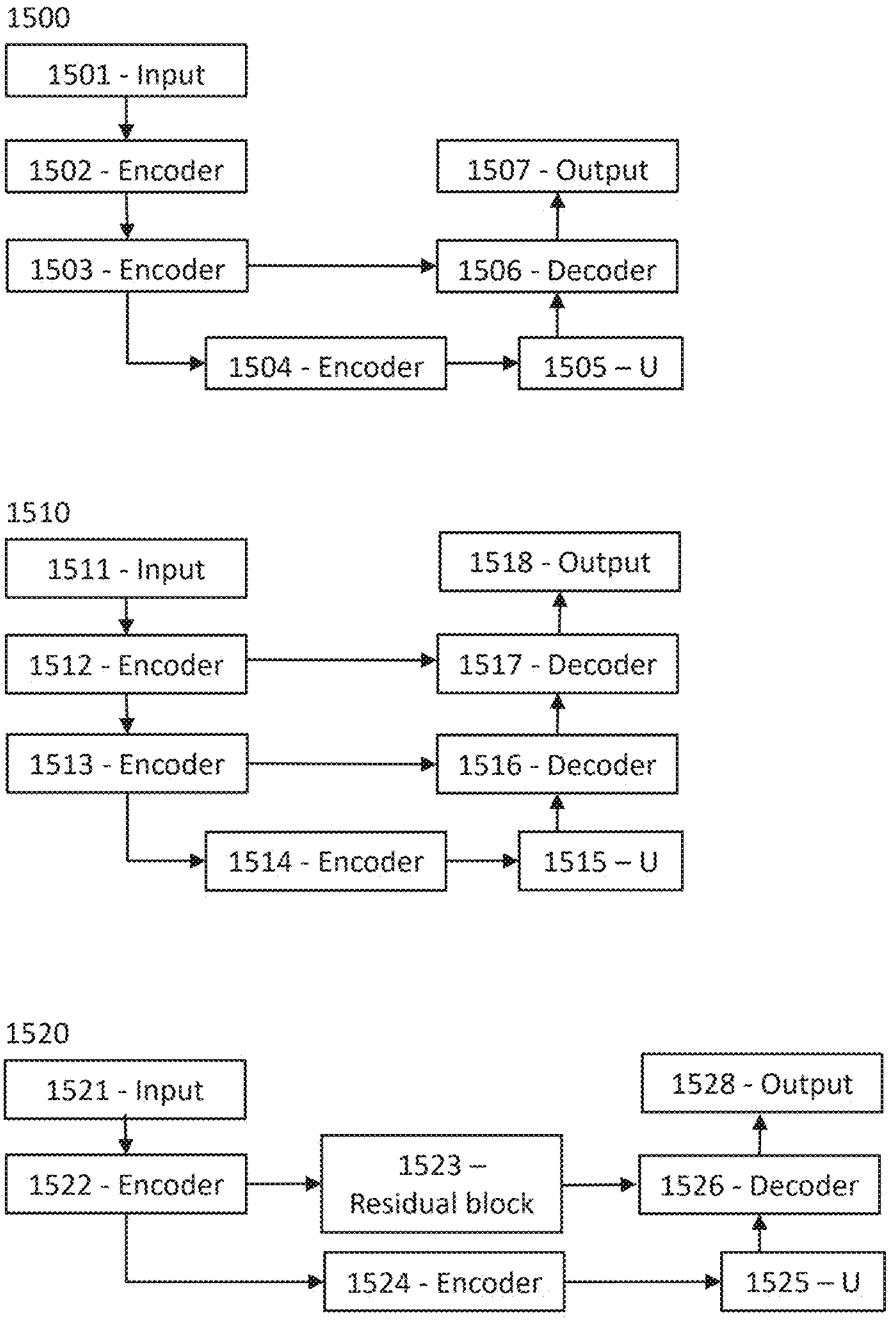
FIG. 15 shows embodiments of encoder-decoders where at least one decoder has two sources of input.

FIG. 15 shows embodiments of encoder-decoders where at least one decoder has two sources of input.

Encoder-decoder 1500 shows an encoder-decoder with three encoders, a decoder, and an upsampling layer. Input 1501 is input into encoder 1502, whose output is in turn input into encoder 1503. The output of encoder 1503 is then used as input for encoder 1504. At encoder 1504, the encoder-decoder switches to decoding, and the output of encoder 1504 is used as input for upsampling 1505. The output of upsampling 1505 is then combined with the output of encoder 1503 to be used as input for decoder 1506, and the output 1507 of decoder 1506 may be the final image. Encoder-decoder 1500 has two levels of detail at which the input 1501 may be encoded.

In this embodiment, encoder-decoder 1500 returns a denoised image of a smaller size and lower resolution than the input image.

Encoder-decoder 1510 shows an encoder-decoder with three encoders, a decoder, and an upsampling layer. Input 1511 is input into encoder 1512, whose output is in turn input into encoder 1513. The output of encoder 1513 is then used as input for encoder 1514. At encoder 1514, the encoder-decoder switches to decoding, and the output of encoder 1514 is used as input for upsampling 1515. The output of upsampling 1515 is then combined with the output of encoder 1513 to be used as input for decoder 1516. Decoder 1517 combines two sources of input as well: the output of decoder 16 and the output of encoder 1512. The output 1518 of decoder 1517 may be the final image.

Encoder-decoder 1510 has two levels of detail at which the input 1511 may be encoded. In this embodiment, both levels of detail are linked by using two sources of input for decoders 1516 and 1517, including ones based on the output of corresponding encoders 1513 and 1512 respectively.

Encoder-decoder 1520 shows an encoder-decoder with two encoders, a decoder, and an upsampling layer. Input 1521 is input into encoder 1522, whose output is input for both residual block 1523 and encoder 1524. At encoder 1524, the encoder-decoder switches to decoding, and the output of encoder 1524 is used as input for upsampling 1525. The output of upsampling 1525 is then combined with the output of encoder 1522 to be used as input for decoder 1526, and the output 1528 of decoder 1526 may be the final image.

Encoder-decoder 1520 is similar to FIG. 14, encoder-decoder 1430. Instead of using the output of encoder 1522 as a second source of input for decoder 1526, it inserts a residual block 1523 between them. This allows the output of encoder 1522 to be trained for improved results from the neural network.

FIGS. 16A and 16B shows embodiments of different placements of a residual block.

Both encoder-decoders 1600 and 1610 have similar structures. However, they allow for learning at different levels of detail-encoder-decoder 1600 places residual block at a higher level of detail, and encoder-decoder 1610 places residual block at a lower level of detail.

Figure 17:
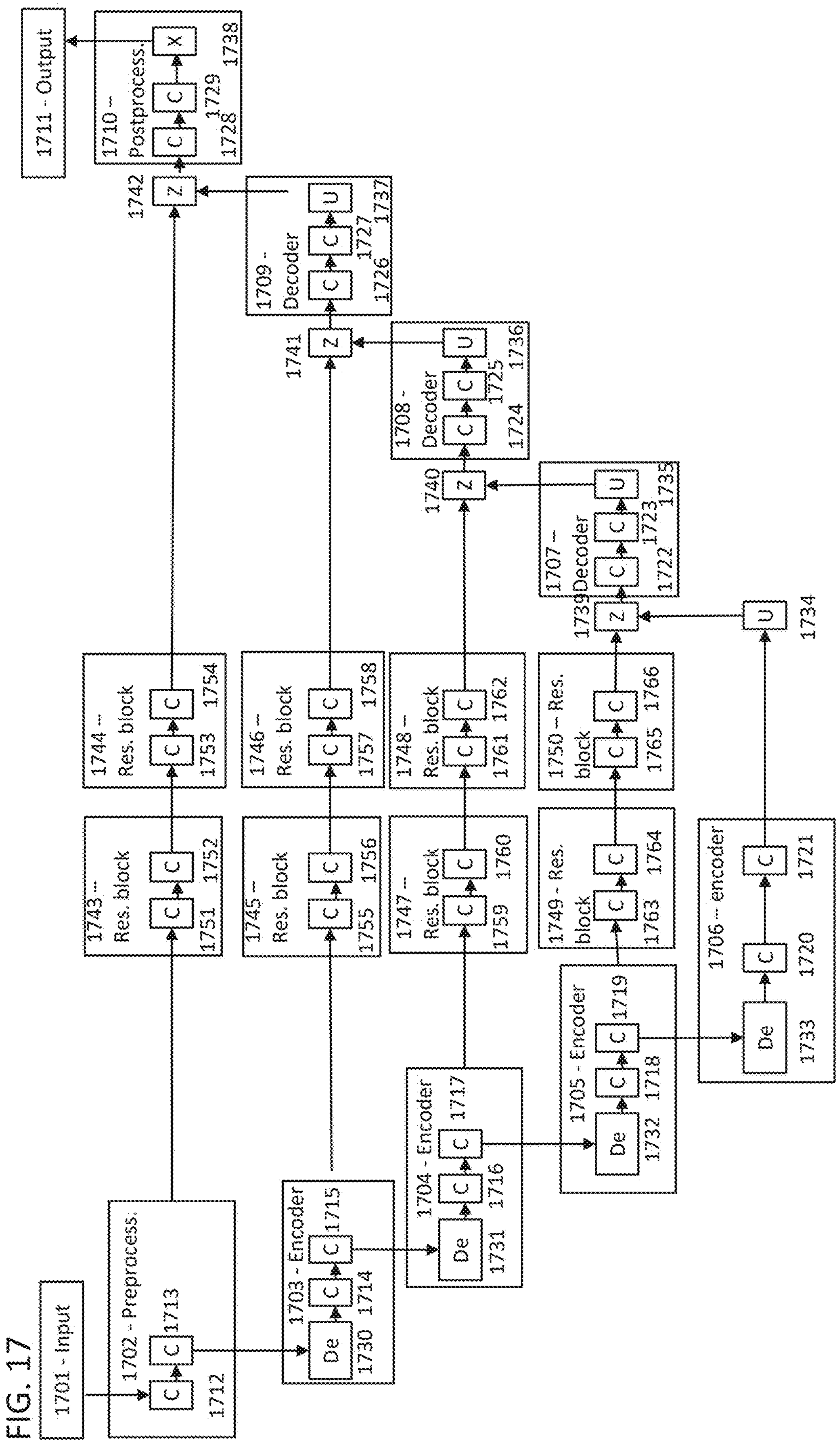
FIG. 17 shows an encoder-decoder with four layers of residual blocks, pre-processing, and post-processing.

FIG. 17 shows an encoder-decoder with four layers of residual blocks, pre-processing, and post-processing.

In this embodiment, Input 1701 is used as input for pre-processing 1702. In the training stage, Input 1701 is a noisy image of the first type, for example, a grayscale photograph. After training, input 1701 is a dental image of the second type, for example, a dental pantomogram. Pre-processing 1702 comprises convolutional layers 1712 and 1713, each of which is comprised of two 3×3 convolutions. The output of preprocessing 1702 is used both as input for residual block 1743 and input for first encoder 1703. Pre-processing 1702's output to residual block 1743 allows for detailed features from input 1701 to be passed on to the image much closer to the final output, which may allow for the preservation of important details.

Encoders 1703, 1704, 1705, and 1706 have the same structure, each comprising a downsampling layer and two convolutional layers. The downsampling layers 1730 to 1733 use decimation to downsample. The convolutional layers 1712 to 1721 each comprise two padded 3×3 convolutions and a ReLu unit.

Residual blocks 1743 to 1750 work in pairs, with each pair may process data between an encoder and decoder where the encoder's output is at the same level of detail as the decoder's input. The residual block pair may also process data between postprocessing and preprocessing.

In this embodiment, residual blocks 1743-1750 are the same, and each is comprised of two convolutional layers. The convolutional layers 1751-1766 are each comprised of a 3×3 convolution and a ReLu activation function.

As discussed above, connecting encoder output to decoder input directly for features to be passed on at different levels of detail, without losing them in the encoding. Hence, they should be at the same level of detail. Residual blocks further improve the denoising by allowing only the neural network to select only those features that improve denoising from the encoder or the output of pre-processing. Here, the residual blocks operate sequentially in pairs, but as demonstrated e.g., in FIG. 16 and FIG. 20, they may be arranged in other ways.

First Encoder 1703's output is passed to both residual block 1745 and second encoder 1704. The same procedure is repeated third encoder 1704, which outputs to encoder 1705 and residual block 1747, and fourth encoder 1705, which outputs to encoder 1706 and residual block 1749.

As the image passes through the encoders, its size and level of detail decrease, due to the downsampling layers. The convolutional layers may also decrease size if they are unpadded, but that is not the case here. Padded convolutions ensure that every pixel in the image is taken into account, and therefore, makes full use of the image. This may be particularly important for radiographic images, where taking unnecessary images means a higher dose of radiation for the patient.

Encoder 1705 inputs to encoder 1706, whose output has the lowest level of detail in the neural network. Here, the encoder-decoder pivots to decoding. The output of encoder 1706 is used as input for upsampling 1734, which increases the size of the image, as discussed above.

Upsampling makes crude predictions based only on the information it has available; hence denoising is improved when combining it with another source of information that has more details from the original image. Thus, the output of upsampling 1734 is concatenated with the output of residual block 1750, which is based on the output of encoder 1705 as processed through residual blocks 1749 and 1750. This concatenated input 1739 is then input into decoder 1707. A similar process happens to the other decoders 1708 and 1709, as can be seen from the illustration.

Encoders 1707, 1708, and 1709 have a similar structure, each comprising an upsampling layer 1735, 1736, and 1737 and two convolutional layers 1722 to 1727.

Decoders 1707 to 1709 are comprised of two convolutional layers, each comprising two padded 3×3 convolutions and a ReLu activation function, and an upsampling.

Concatenated input 1739 has characteristics both at higher level of detail, as passed on indirectly or directly from encoder 1705, and at a lower level of detail from encoder 1706. This is then input into decoder 1707. This allows decoder 1707 to better predict what the denoised image should look like at that level of detail. A similar process happens to the other decoders 1708 and 1709.

The output of decoder 1707 is concatenated with the output of residual block 1747 into concatenated input 1740 for decoder 1708; the same process is performed for decoder 1709 by combining the output of residual block 1746 and decoder 1708 into concatenated input 1741 for decoder 1709; and for postprocessing 1710 by combining the output of residual block 1744 and decoder 1709 into concatenated input 1742 for postprocessing 1710.

Postprocessing 1710 is comprised of two convolutional layers 1728 and 1729, and a final convolution 1738. The two convolutional layers 1728 and 1729 comprise two padded 3×3 convolutions and a ReLu activation function, and allow the training of the image. The final convolution 1738 reduces the number of filters on the image.

The result is output 1711, the denoised image.

Figure 18:
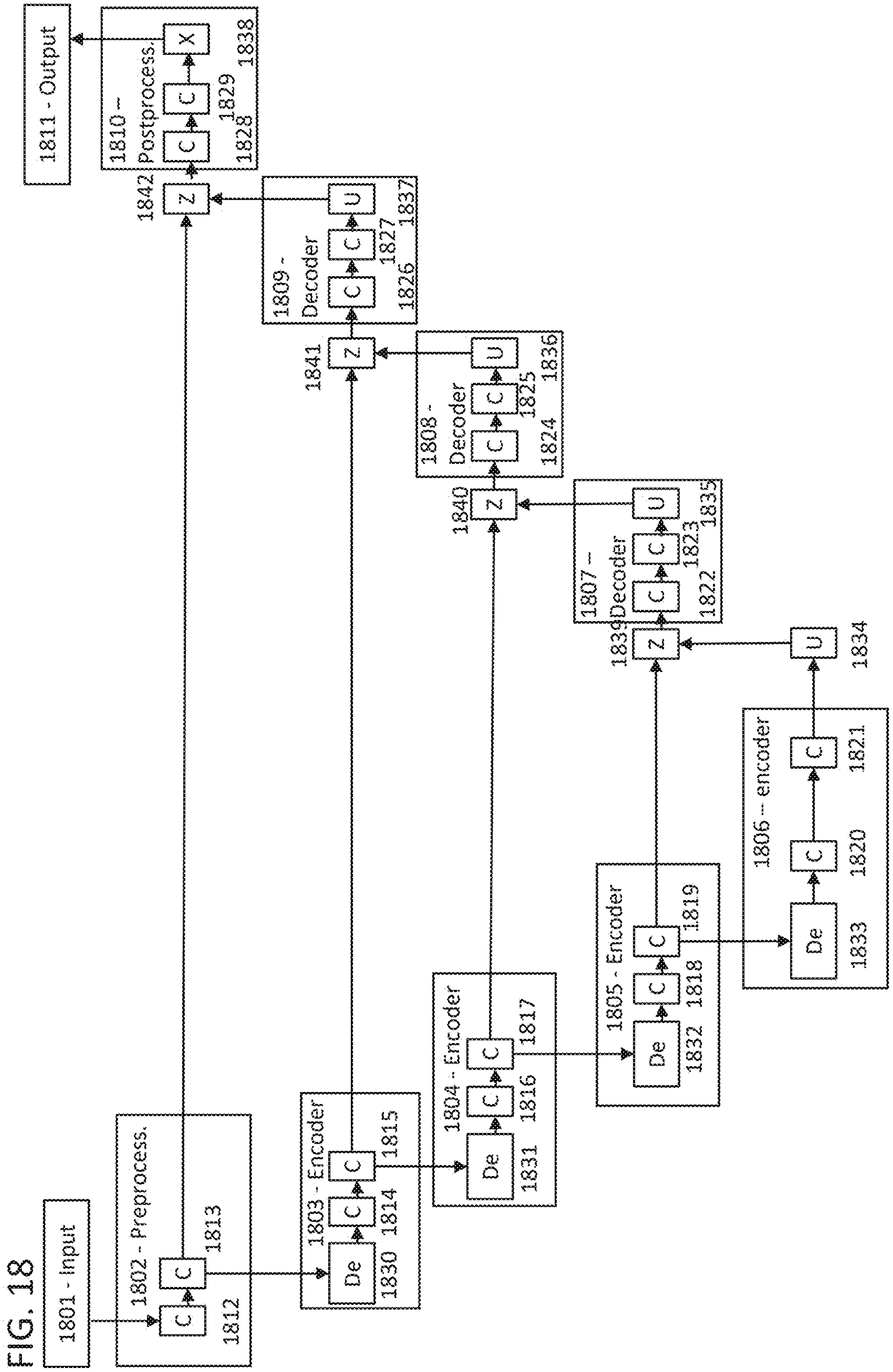
FIG. 18 shows an embodiment of the architecture of the at least one neural network where there are four encoders, three decoders, and pre- and postprocessing.

FIG. 18 shows an embodiment of the architecture of the at least one neural network where there are four encoders, three decoders, and pre- and postprocessing. FIG. 18 shows an encoder-decoder similar to that in FIG. 17 without residual blocks.

In this embodiment, Input 1801 is used as input for pre-processing 1802. In the training stage, Input 1801 is a noisy image of the first type, for example, a grayscale photograph. After training, input 1801 is a dental image of the second type, for example, a dental pantomogram. Pre-processing 1802 comprises convolutional layers 1812 and 1813, each of which is comprised of two 3×3 convolutions. The output of preprocessing 1802 is used both as input for residual block 1842 and input for first encoder 1803. Pre-processing 1802's output to residual block 1842 allows for detailed features from input 1801 to be passed on to the image much closer to the final output, which may allow for the preservation of important details.

Encoders 1803, 1804, 1805, and 1806 have the same structure, each comprising a downsampling layer and two convolutional layers. The downsampling layers 1830 to 1833 use decimation to downsample. The convolutional layers 1812 to 1821 each comprise two padded 3×3 convolutions and a ReLu unit.

As discussed above, connecting encoder output to decoder input directly for features to be passed on at different levels of detail, without losing them in the encoding. Hence, they should be at the same level of detail.

First Encoder 1803's output is passed to both decoder 1809, by way of concatenation 1841, and to second encoder 1804. The same procedure is repeated for second encoder 1804, which outputs to encoder 1805 and decoder 1808, and third encoder 1805, which outputs to encoder 1806 and decoder 1807.

As the image passes through the encoders, its size and level of detail decrease, due to the downsampling layers. The convolutional layers may also decrease size if they are unpadded, but that is not the case here. Padded convolutions ensure that every pixel in the image is taken into account, and therefore makes full use of the image. This may be particularly important for radiographic images, where taking unnecessary images means a higher dose of radiation for the patient.

Encoder 1805 inputs to encoder 1806, whose output has the lowest level of detail in the neural network. Here, the encoder-decoder pivots to decoding. The output of encoder 1806 is used as input for upsampling 1834, which increases the size of the image, as discussed above.

Upsampling makes predictions based only on the information it has from the downsampled data; hence denoising is improved when combining it with another source of information that has more details from the original image. Thus, the output of upsampling 1834 is concatenated with the output of encoder 1805 as described above. This concatenated input 1839 is then input into decoder 1807. A similar process happens to the other decoders 1808 and 1809, as can be seen from the illustration. Thus, the output of upsampling 1835 is concatenated with the output of encoder 1804 to provide concatenated input 1840 for decoder 1808 and the output of upsampling 1836 is concatenated with the output of encoder 1803 to provide concatenated input 1841 for decoder 1809.

Decoders 1807 to 1809 are comprised of two convolutional layers 1822 to 1827, each comprising two padded 3×3 convolutions and a ReLu activation function, and an upsampling 1835 to 1837.

Concatenated input 1839 has characteristics both at higher level of detail, as passed on indirectly or directly from encoder 1805, and at a lower level of detail from encoder 1806. This is then input into decoder 1807. This allows decoder 1807 to better predict what the denoised image should look like at that level of detail. A similar process happens to the other decoders 1808 and 1809.

Postprocessing 1810 is comprised of two convolutional layers 1828 and 1829, and a final convolution 1838. The two convolutional layers 1828 and 1829 comprise two padded 3×3 convolutions and a ReLu activation function, and allow the training of the image. The final convolution 1838 reduces the number of filters on the image.

The result is output 1811, the denoised image.

Figure 19:
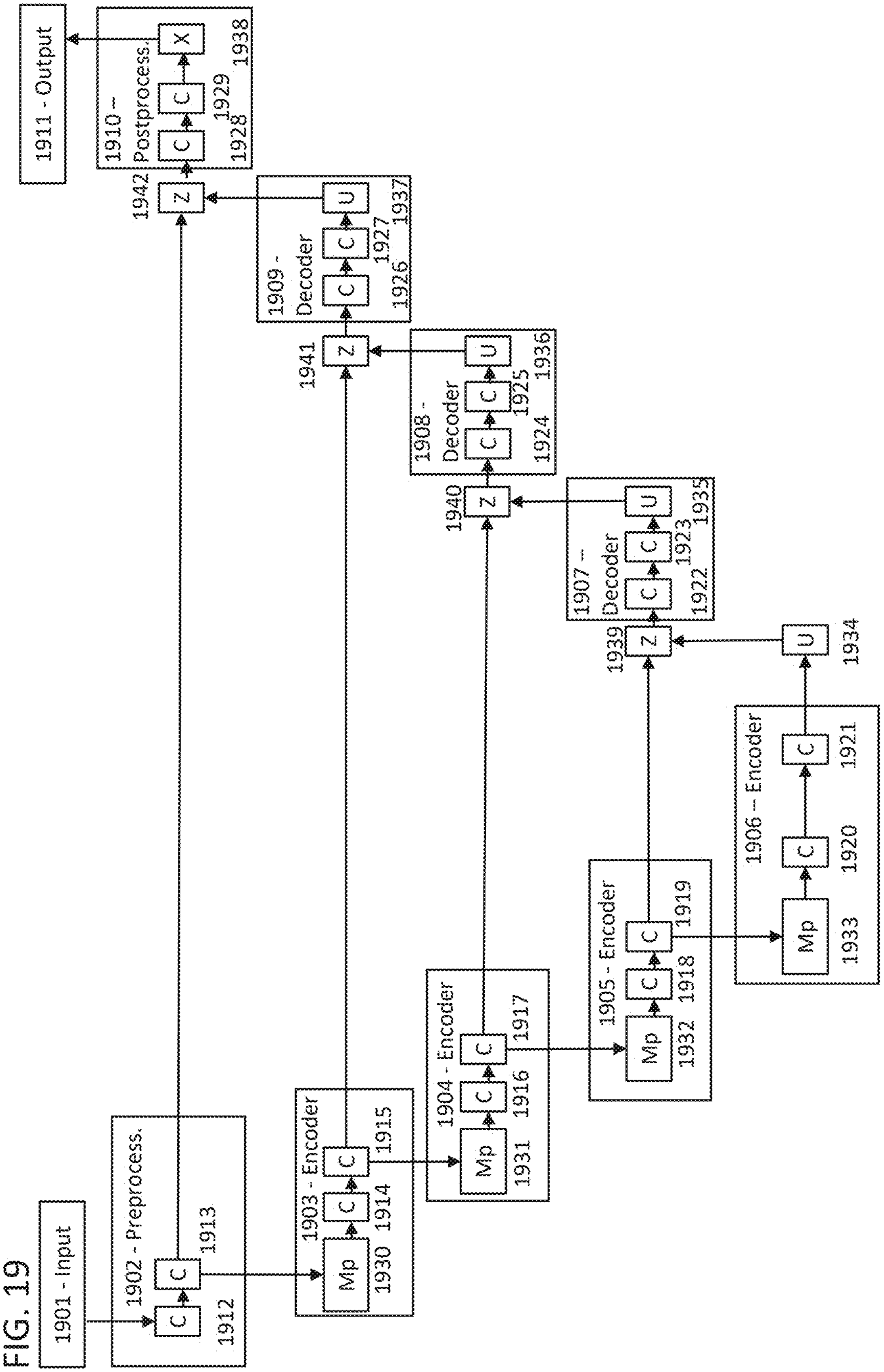
FIG. 19 shows an embodiment of the architecture of the at least one neural network where there are four encoders, three decoders, and pre- and postprocessing.

FIG. 19 shows an embodiment of the architecture of the at least one neural network where there are four encoders, three decoders, and pre- and postprocessing. FIG. 19 shows an encoder-decoder similar to that in FIG. 17 without residual blocks.

In this embodiment, Input 1901 is used as input for pre-processing 1902. In the training stage, Input 1901 is a noisy image of the first type, for example, a grayscale photograph. After training, input 1901 is a dental image of the second type, for example, a dental pantomogram. Preprocessing 1902 comprises convolutional layers 1912 and 1913, each of which is comprised of two 3×3 convolutions. The output of preprocessing 1902 is used both as input for residual block 1942 and input for first encoder 1903. Preprocessing 1902's output to residual block 1942 allows for detailed features from input 1901 to be passed on to the image much closer to the final output, which may allow for the preservation of important details.

Encoders 1903, 1904, 1905, and 1906 have the same structure, each comprising a downsampling layer and two convolutional layers. The downsampling layers 1930 to 1933 use MaxPool to downsample. The convolutional layers 1912 to 1921 each comprise two 3×3 convolutions and a ReLu unit. As the convolutions are unpadded, the image shrinks by a single pixel around the border of each image.

As discussed above, connecting encoder output to decoder input directly for features to be passed on at different levels of detail, without losing them in the encoding. Hence, they should be at the same level of detail.

First Encoder 1903's output passed to both decoder 1909 by way of concatenation 1941, and to second encoder 1904. The same procedure is repeated for second encoder 1904, which outputs to encoder 1905 and decoder 1908, and third encoder 1905, which outputs to encoder 1906 and decoder 1907. Where encoder output is passed on to the concatenation, it may need to be cropped to fit upsampling output.

As the image passes through the encoders, its size and level of detail decrease, due to the downsampling layers and the unpadded convolutions.

Encoder 1905 inputs to encoder 1906, whose output has the lowest level of detail in the neural network. Here, the encoder-decoder pivots to decoding. The output of encoder 1906 is used as input for upsampling 1934, which increases the size of the image, as discussed above.

Upsampling makes predictions based only on the information it has from the downsampled data; hence denoising is improved when combining it with another source of information that has more details from the original image. Thus, the output of upsampling 1934 is concatenated with the output of encoder 1905 as described above. This concatenated input 1939 is then input into decoder 1907. A similar process happens to the other decoders 1908 and 1909, as can be seen from the illustration. Thus, the output of upsampling 1935 is concatenated with the output of encoder 1904 to provide concatenated input 1940 for decoder 1908 and the output of upsampling 1936 is concatenated with the output of encoder 1903 to provide concatenated input 1941 for decoder 1909.

Decoders 1907 to 1909 are comprised of two convolutional layers 1922 to 1927, each comprising two unpadded 3×3 convolutions and a ReLu activation function, and an upsampling 1935 to 1937.

Concatenated input 1939 has characteristics both at higher level of detail, as passed on indirectly or directly from encoder 1905, and at a lower level of detail from encoder 1906. This is then input into decoder 1907. This allows decoder 1907 to better predict what the denoised image should look like at that level of detail. A similar process happens to the other decoders 1908 and 1909.

Postprocessing 1910 is comprised of two convolutional layers 1928 and 1929, and a final convolution 1938. The two convolutional layers 1928 and 1929 comprise two unpadded 3×3 convolutions and a ReLu activation function, and allow the training of the image. The final convolution 1938 reduces the number of filters on the image.

The result is output 1911, the denoised image.

Figure 20:
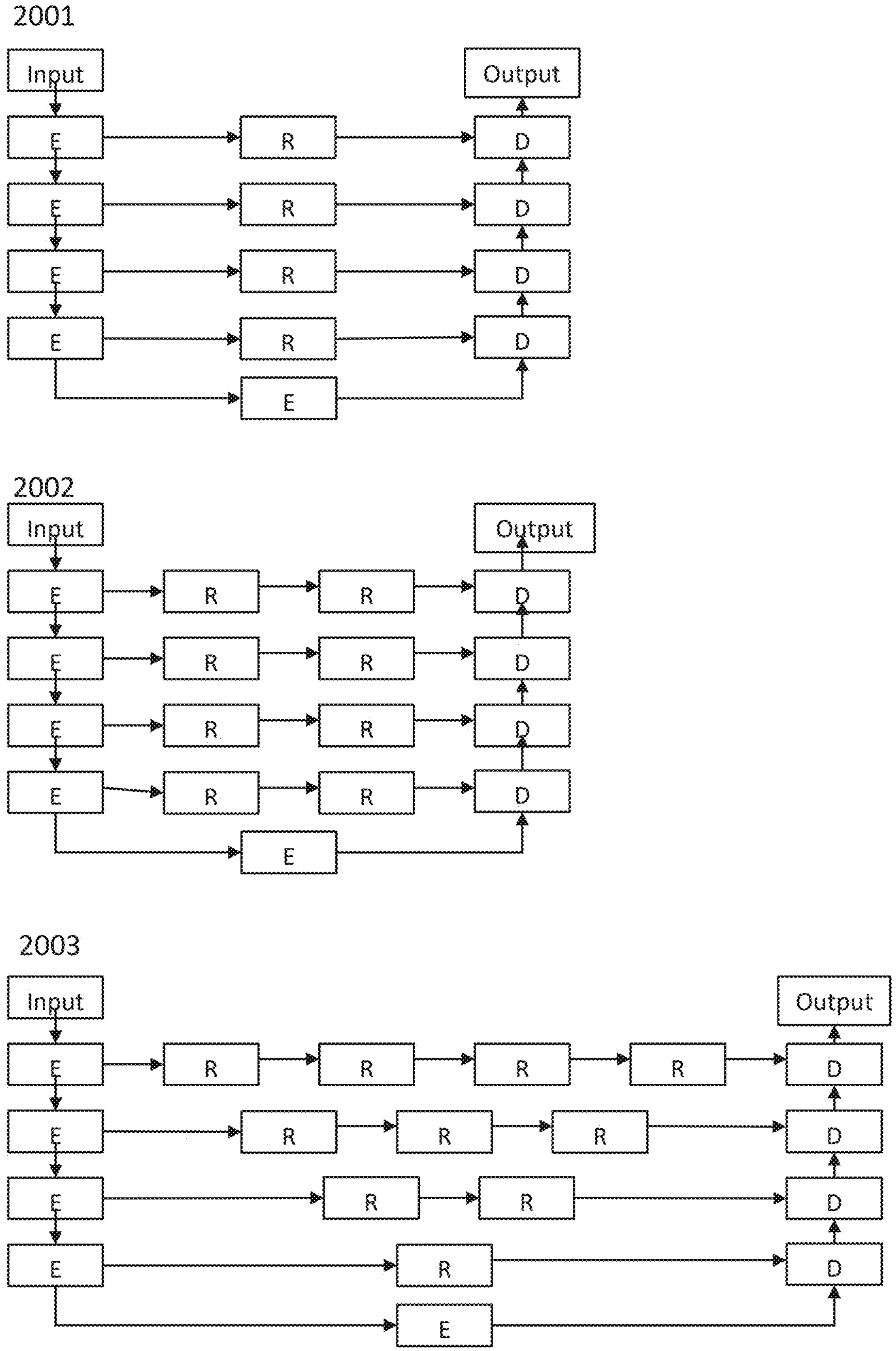
FIG. 20 shows embodiments of architectures of residual blocks.

FIG. 20 shows embodiments of architectures of residual blocks.

Neural network 2001 shows a simple architecture of residual blocks R, where there is a single residual block R between each corresponding encoder E and decoder D.

Neural network 2002 shows a serial architecture of residual blocks R, where there is a series of two residual blocks R between each corresponding encoder E and decoder D. Although this embodiment shows only two, there may be more.

Neural network 2003 shows a pyramid architecture of residual blocks R, where the corresponding encoder E and decoder D at the highest level of detail have more residual blocks R-here, four- and the number of residual blocks R decreases as the level of detail of the corresponding encoder E and decoder D gets lower. This allows for more training where there is more detail, and less training where these is less detail.

Although some embodiments have been described and shown in detail, the disclosure is not restricted to them, but may also be embodied in other ways within the scope of the subject matter defined in the following claims. In particular, it is to be understood that other embodiments may be utilized and structural and functional modifications may be made without departing from the scope of the present disclosure.

In system and/or device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

The term "obtaining" as used in this specification may refer to physically acquiring, for example, medical images using a medical imaging device, but it may also refer, for example, to loading into a computer an image or a digital representation previously acquired.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and, in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

An exemplary embodiment relates to a computer-implemented method of denoising dental images, comprising: obtaining a training set comprising images of a first type, wherein the training set comprises a plurality of data pairs, where each data pair comprises a noisy image and a true image, where the noisy image is the true image with generated noise; training at least one neural network on the training set, wherein input for the at least one neural network is a plurality of the noisy images, and a target of the at least one neural network is a plurality of the true images that correspond to the plurality of the noisy images, such that inputting a noisy image into a trained neural network is results in output of a denoised image similar to a true image corresponding to the input noisy image; obtaining a dental image of a second type; and denoising a dental image of the second type by using the image of the second type as input for the trained neural network.

In some embodiments, the images of the first type include images acquired by a medical imaging modality.

In some embodiments, the dental image of the second type is a radiographic image, a fluorescence image, and/or an infrared image.

In some embodiments, the method includes generating at least one of the data pairs by: generating a noise matrix; and generating the noisy image by combining the true image with the noise matrix, where the data pair is comprised of the true image and the generated noisy image.

In some embodiments, the method includes generating the noise matrix by: generating an empty matrix; generating values from a probability distribution; and generating the noise matrix by assigning one of the generated values to each element of the empty matrix.

In some embodiments, the method includes generating the noise matrix with at least one blurring kernel by: generating a blurring kernel, comprising a matrix of dimensions of at least two by one, where each element of the blurring kernel has a weight value; selecting an element of the noise matrix; and altering the value of the selected element based on the combined value of at least one neighboring element and the weight values of at least one corresponding element of the blurring kernel.

In some embodiments, the method includes generating a spatially variant noise matrix by generating a smooth scaling map; and generating the spatially variant noise matrix by applying the smooth scaling map to a noise matrix.

In some embodiments, the method includes generating the smooth scaling map with a 2D kernel by generating an initial matrix populated by identical values; generating the 2D kernel; selecting an element of the initial matrix; and generating a smooth scaling map by locating the 2D kernel based on the selected element, and applying each element of the 2D kernel to a corresponding element on the initial matrix.

In some embodiments, the method includes generating the smooth scaling map with an edge map by: generating an initial matrix populated by identical values; generating an edge for the initial matrix; generating an edge shape; generating the edge map by applying the edge shape along the edge; and generating the smooth scaling map by applying the edge map to the initial matrix.

In some embodiments, the method includes generating a new smooth scaling map by combining at least two existing smooth scaling maps.

In some embodiments, the method includes generating the noise matrix with line scaling by generating values from a normal distribution for each line in the noise matrix; and applying one of the generated values to each element of the line.

In some embodiments, the at least one neural network is an encoder-decoder and the method includes encoding the images of the first type and/or the second type into intermediate data through at least one encoder, where each encoder comprises at least one convolutional layer and at least one downsampling; and decoding data based on output of at least one of the at least one encoder through at least one decoder, where each decoder comprises at least one convolutional layer and at least one upsampling, and the output of each decoder is intermediate data, denoised images, and/or true images.

In some embodiments, the at least one neural network further comprises at least one upsampling and/or downsampling.

In some embodiments, the method includes combining at least two sources of input; and decoding the combined at least two sources of input with at least one of the at least one decoder.

In some embodiments, the method includes preprocessing the images before a first encoder of the at least one neural network with at least one convolutional layer; postprocessing the images after a final decoder of the at least one neural network with at least one convolutional layer and/or at least one convolution; and using input for the postprocessing based on output of the preprocessing.

In some embodiments, the method includes preprocessing the images before a first encoder of the at least one neural network with at least one convolutional layer.

In some embodiments, the method includes postprocessing the images after a final decoder of the at least one neural network with at least one convolutional layer and/or at least one convolution.

In some embodiments, the method includes using input for the postprocessing based on output of the preprocessing.

In some embodiments, the at least one neural network comprises at least one residual block, and the method includes processing data through the at least one residual block, where each residual block comprises at least one convolutional layer, and is located between a corresponding decoder and a corresponding encoder or between the preprocessing and the postprocessing.

In some embodiments, the at least one neural network comprises at least two sets of residual blocks, and the method includes using output of an earlier encoder as input for an earlier set of at least two residual blocks, and output of the earlier set is used as input for a decoder corresponding to the earlier encoder; and using output of a subsequent encoder as input for a subsequent set of at least one residual block, but fewer residual blocks than the earlier set, and output of the subsequent set is used as input for a decoder corresponding to the subsequent encoder.

In some embodiments, the at least one neural network further comprises a preprocessing-postprocessing set of residual blocks, and the method includes using output of the preprocessing as input for the preprocessing-postprocessing set of residual blocks, comprising more residual blocks than the set of residual blocks corresponding to the earliest encoder; and using output of the preprocessing-postprocessing set of residual blocks as basis for input of the postprocessing.

In some embodiments, the images of the first type include images that are directly used as true images in the data pair.

An exemplary embodiment relates to a computer program product in a non-transitory medium configured, when run, to execute an embodiment(s) of the method(s) disclosed herein.

REFERENCES

Bai, Kunlun. A Comprehensive Introduction to Different Types of Convolutions in Deep Learning. Feb. 11, 2019. towardsdatascience.com/a-comprehensive-introduction-to-different-types-of-convolutions-in-deep-learning-669281e58215

N., Senthilkumaran & Rajesh, Reghunadhan. (2007). Edge Detection Techniques for Image Segmentation—A Survey of Soft Computing Approaches. INFORMATION PAPER International Journal of Recent Trends in Engineering. 1.

The invention claimed is:

1. A computer-implemented method of denoising dental images, comprising:

obtaining a training set comprising images of a first type, wherein the training set comprises a plurality of data pairs, where each data pair comprises a noisy image and a true image, where the noisy image is the true image with generated noise which is created via a concatenation and/or an elementwise multiplication process;

training at least one neural network on the training set, wherein input for the at least one neural network is a plurality of the noisy images, and a target of the at least one neural network is a plurality of the true images that correspond to the plurality of the noisy images, such that inputting a noisy image into a trained neural network results in output of a denoised image similar to a true image corresponding to the input noisy image;

obtaining a dental image of a second type; and denoising the dental image of the second type by using the dental image of the second type as input for the trained neural network via a domain adaptation technique, wherein: the images of the first type and the dental images of the second type belong to different image domains.

2. A method according to claim 1, wherein the images of the first type include images that are directly used as true images in the data pair.

3. A method of claim 1, further comprising generating the noise matrix by:

generating an empty matrix;

generating values from a probability distribution; and generating the noise matrix by assigning one of the generated values to each element of the empty matrix.

4. A method of claim 1, further comprising generating the noise matrix with at least one blurring kernel by:

generating a blurring kernel, comprising a matrix of dimensions of at least two by one, where each element of the blurring kernel has a weight value;

selecting an element of the noise matrix; and altering the value of the selected element based on the combined value of at least one neighboring element and the weight values of at least one corresponding element of the blurring kernel.

5. A method of claim 1, further comprising generating a spatially variant noise matrix by:

generating a smooth scaling map, and generating the spatially variant noise matrix by applying the smooth scaling map to a noise matrix.

6. A method of claim 5, further comprising generating the smooth scaling map with a 2D kernel by:

generating an initial matrix populated by identical values;

generating the 2D kernel;

selecting an element of the initial matrix;

generating a smooth scaling map based on the selected element; and applying each element of the 2D kernel to a corresponding element on the initial matrix.

7. A method of claim 1, further comprising:

generating a smooth scaling map with an edge map by:

generating an initial matrix populated by identical values;

generating an edge for the initial matrix generating an edge shape;

generating the edge map by applying the edge shape along the edge; and generating the smooth scaling map by applying the edge map to the initial matrix.

8. A method of claim 5, further comprising generating a new smooth scaling map by combining at least two existing smooth scaling maps.

9. A method of claim 1, further comprising generating the noise matrix with line scaling by:

generating values from a normal distribution for each line in the noise matrix; and applying one of the generated values to each element of the line.

10. A method of claim 1, where the at least one neural network is an encoder-decoder, the method further comprising:

encoding the images of the first type and/or the second type into intermediate data through at least one encoder, where each encoder comprises at least one convolutional layer and at least one downsampling; and decoding data based on output of at least one of the at least one encoder through at least one decoder, where each decoder comprises at least one convolutional layer and at least one upsampling, and the output of each decoder is intermediate data, denoised images, and/or true images.

11. A method claim 1, where the at least one neural network further comprises at least one upsampling and/or downsampling.

12. A method claim 1, further comprising:

combining at least two sources of input; and decoding the combined at least two sources of input with at least one of the at least one decoder.

13. A method of claim 1, further comprising:

preprocessing the images before a first encoder of the at least one neural network with at least one convolutional layer;

postprocessing the images after a final decoder of the at least one neural network with at least one convolutional layer and/or at least one convolution; and using input for the postprocessing based on output of the preprocessing.

14. A method of claim 1, further comprising preprocessing the images before a first encoder of the at least one neural network with at least one convolutional layer.

15. A method of claim 1, further comprising postprocessing the images after a final decoder of the at least one neural network with at least one convolutional layer and/or at least one convolution.

16. A method of claim 1, further comprising using input for the postprocessing based on output of the preprocessing.

17. A method claim 1, where the at least one neural network comprises at least one residual block, the method further comprising processing data through the at least one residual block, where each residual block comprises at least one convolutional layer, and is located between a corresponding decoder and a corresponding encoder or between the preprocessing and the postprocessing.

18. A method claim 1, where the at least one neural network comprises at least two sets of residual blocks, the method further comprising:

using output of an earlier encoder as input for an earlier set of at least two residual blocks, and output of the earlier set is used as input for a decoder corresponding to the earlier encoder; and using output of a subsequent encoder as input for a subsequent set of at least one residual block, but fewer residual blocks than the earlier set, and output of the subsequent set is used as input for a decoder corresponding to the subsequent encoder.

19. A method of claim 1, where the at least one neural network further comprises a preprocessing-postprocessing set of residual blocks, the method further comprising:

using output of the preprocessing as input for the preprocessing-postprocessing set of residual blocks, comprising more residual blocks than the set of residual blocks corresponding to the earliest encoder; and using output of the preprocessing-postprocessing set of residual blocks as basis for input of the postprocessing.

20. A non-transitory medium including computer program product configured, when run, to execute the method of claim 1.

21. A data processing system comprising a processor configured to perform the steps of the method of claim 1.

* * * * *